US010683400B1

(12) United States Patent
Rodriguez et al.

(10) Patent No.: US 10,683,400 B1
(45) Date of Patent: Jun. 16, 2020

(54) CHEMICALLY OR ENVIRONMENTALLY RESPONSIVE POLYMERS WITH REVERSIBLE MECHANICAL PROPERTIES

(71) Applicant: HRL Laboratories, LLC, Malibu, CA (US)

(72) Inventors: April R. Rodriguez, Los Angeles, CA (US); Ashley M. Nelson, Los Angeles, CA (US); Shanying Cui, Calabasas, CA (US); Andrew P. Nowak, Los Angeles, CA (US); Adam F. Gross, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 161 days.

(21) Appl. No.: 15/792,098

(22) Filed: Oct. 24, 2017

Related U.S. Application Data

(63) Continuation-in-part of application No. 15/391,749, filed on Dec. 27, 2016, now Pat. No. 10,240,065, (Continued)

(51) Int. Cl.
*C08K 3/06* (2006.01)
*C08J 3/24* (2006.01)
(Continued)

(52) U.S. Cl.
CPC .............. *C08J 3/24* (2013.01); *C08G 18/242* (2013.01); *C08G 18/246* (2013.01);
(Continued)

(58) Field of Classification Search
CPC ........ C09D 175/08; C09D 7/61; C08G 18/10; C08G 18/242; C08G 18/758;
(Continued)

(56) References Cited

U.S. PATENT DOCUMENTS 3,435,003 A 3/1969 Craven
3,810,874 A 5/1974 Mitsch et al.
(Continued)

FOREIGN PATENT DOCUMENTS

EP 1558661 B1 12/2012
WO 2005086628 A2 9/2005
WO 2013158360 A1 10/2013

OTHER PUBLICATIONS

A redox responsive polymeric gel based on ionic crosslinking. Allock et al. Soft Matter, 2006, 2, 397-401.*
(Continued)

*Primary Examiner* — Michael L Leonard
(74) *Attorney, Agent, or Firm* — O'Connor & Company

(57) ABSTRACT

This invention provides compositions and methods for reversible ionic crosslinking in polymers, providing tunability of polymer mechanical properties. Some variations provide a polymer composition comprising: a polymer containing a plurality of ionic species disposed along the chain backbone of the polymer, wherein the plurality of ionic species has an ionic charge polarity that is negative or positive; a redox reagent; and a reversible crosslinking agent capable of changing from a first oxidation state to a second oxidation state when in the presence of the redox reagent. The different oxidation states are associated with different coordination numbers between the reversible crosslinking agent and the ionic species contained in the polymer. This difference provides reversible ionic crosslinking. The polymer may be selected from polyurethanes (including segmented and non-segmented polyurethanes), polyacrylates, or polyamides, for example. These polymers are useful for many commercial applications, including coatings and polymer parts.

25 Claims, 6 Drawing Sheets

Related U.S. Application Data which is a continuation-in-part of application No. 15/073,610, filed on Mar. 17, 2016, now Pat. No. 10,259,971.

(60) Provisional application No. 62/417,856, filed on Nov. 4, 2016, provisional application No. 62/271,942, filed on Dec. 28, 2015, provisional application No. 62/269,984, filed on Dec. 19, 2015, provisional application No. 62/269,366, filed on Dec. 18, 2015.

(51) Int. Cl.

| | |
|---|---|
| C08G 18/48 | (2006.01) |
| C08G 18/24 | (2006.01) |
| C09D 175/08 | (2006.01) |
| C08J 3/28 | (2006.01) |
| C08J 5/18 | (2006.01) |
| C08G 18/75 | (2006.01) |
| C08K 3/08 | (2006.01) |
| C08G 18/34 | (2006.01) |
| C09D 7/61 | (2018.01) |
| C08G 18/10 | (2006.01) |

(52) U.S. Cl.
CPC ....... *C08G 18/4833* (2013.01); *C08G 18/758* (2013.01); *C08J 3/28* (2013.01); *C08J 5/18* (2013.01); *C08K 3/08* (2013.01); *C09D 175/08* (2013.01); *C08G 18/10* (2013.01); *C08G 18/348* (2013.01); *C08K 2003/085* (2013.01); *C08K 2003/0856* (2013.01); *C08K 2003/0862* (2013.01); *C09D 7/61* (2018.01)

(58) Field of Classification Search
CPC ............ C08G 18/5015; C08G 18/4833; C08G 18/246; C08G 18/348; C08G 2150/90; C08K 3/08; C08K 2003/085; C08K 2003/0856; C08K 2003/0862

See application file for complete search history.

(56) References Cited

U.S. PATENT DOCUMENTS

| | | | |
|---|---|---|---|
| 3,847,978 | A | 11/1974 | Sianesi et al. |
| 4,299,895 | A | 11/1981 | Archie et al. |
| 4,777,224 | A | 10/1988 | Gorzynski et al. |
| 4,956,438 | A | 9/1990 | Ruetman et al. |
| 5,032,666 | A | 7/1991 | Hu et al. |
| 5,084,315 | A | 1/1992 | Karimi et al. |
| 5,189,135 | A | 2/1993 | Cozzi et al. |
| 5,332,798 | A | 7/1994 | Ferreri et al. |
| 5,589,552 | A | 12/1996 | Simeone et al. |
| 6,071,564 | A | 6/2000 | Marchetti et al. |
| 6,926,937 | B2 | 8/2005 | Extrand et al. |
| 6,992,132 | B2 | 1/2006 | Trombetta et al. |
| 7,655,310 | B2 | 2/2010 | Trombetta |
| 2004/0019143 | A1 | 1/2004 | Koloski et al. |
| 2004/0067433 | A1 | 4/2004 | Nirmal et al. |
| 2005/0164010 | A1 | 7/2005 | Trombetta |
| 2005/0181252 | A1 | 8/2005 | Risen, Jr. et al. |
| 2006/0025560 | A1* | 2/2006 | Inoue ............... C08G 63/06 528/272 |
| 2006/0160979 | A1* | 7/2006 | Benecke ............ C08G 18/10 528/44 |
| 2008/0004395 | A1* | 1/2008 | Covelli ............ C08G 18/0823 524/591 |
| 2008/0219944 | A1 | 9/2008 | Longo et al. |
| 2009/0127492 | A1 | 5/2009 | Risen, Jr. et al. |
| 2010/0261865 | A1* | 10/2010 | Militz ............... C23C 18/1658 528/61 |
| 2010/0324205 | A1 | 12/2010 | Maier et al. |
| 2011/0218290 | A1 | 9/2011 | Webster et al. |
| 2011/0213085 | A1 | 11/2011 | Tonelli et al. |
| 2012/0164565 | A1 | 6/2012 | Qiu |
| 2015/0158969 | A1 | 6/2015 | Nowak |
| 2015/0329453 | A1 | 11/2015 | Guarda et al. |

OTHER PUBLICATIONS

Ashish Vaidya and Manoj K. Chaudhury, "Synthesis and Surface Properties of Environmentally Responsive Segmented Polyurethanes," Journal of Colloid and Interface Science 249, 235-245 (2002).

Siochi et al., "Engineered Surfaces for Mitigation of Insect Residue Adhesion" NF1676L-15481 SAMPE 2013; May 6-9, 2013; Long Beach, CA; United States.

Wohl et al., "Evaluation of commercially available materials to mitigate insect residue adhesion on wing leading edge surfaces," Progress in Organic Coatings 76 (2013) 42-50.

Kok et al., "Influence of surface characteristics on insect residue adhesion to aircraft leading edge surfaces," Progress in Organic Coatings 76 (2013) 1567-1575.

Lee et al., "Zwitter-Wettability and Antifogging Coatings with Frost-Resisting Capabilities," ACS Nano 7 (2013) 2172-2185.

Chen et al., "Robust Prototypical Anti-icing Coatings with a Self-lubricating Liquid Water Layer between Ice and Substrate," ACS Appl. Mater. Interfaces 5 (2013) 4026-4030.

Turri et al., "Waterborne Anionomeric Polyurethane—Ureas from Functionalized Fluoropolyethers," Journal of Applied Polymer Science, vol. 93, 136-144 (2004).

Dou et al., "Anti-icing Coating with an Aqueous Lubricating Layer," ACS Appl. Mater. Interfaces 2014, 6, 6998-7003.

Wang et al., "Investigation of the role of hydrophilic chain length in amphiphilic perfluoropolyether/poly(ethylene glycol) networks: towards high-performance antifouling coatings," Biofouling vol. 27, No. 10, Nov. 2011, 1139-1150.

Chen et al., "A Thermally Re-mendable Cross-Linked Polymeric Material," Science 295 (5560), 1698-1702, Mar. 1, 2002.

Oster et al., "Photoreduction of Metal Ions by Visible Light," Departmenotf Chemistry, Polytechnic Institute of Brooklyn, 135th National meeting of the American Chemical Society, Nov. 5, 1959.

Wojtecki et al., "using the dynamic bond to access macroscopically responsive structurally dynamic polymers," Nature Materials vol. 10, Jan. 2011.

Min et al., "Use of Ascorbic Acid as Reducing Agent for Synthesis of Well-Defined Polymers by ARGET ATRP" Macromolecules 2007, 40, 1789-1791.

Nair et al., "Synthesis and characterization of calcium-containing polyurethane using calcium lactate as a chain extender" Polymer Journal (2012) 44, 1009-1014.

Nair et al., "Synthesis, Characterization, and Electrospinning of Calcium-Containing Polyurethane Urea" Advances in Polymer Technology, vol. 35, No. 3, 2016.

Peng et al., "Synthesis of Conjugated Polymers Containing Ionic Transition Metal Complexes" J. Am. Chem. Soc. 1996, 118, 3777-3778.

Xu et al., "Design of Self-Healing Supramolecular Rubbers by Introducing Ionic Cross-Links into Natural Rubber via a Controlled Vulcanization" ACS Appl. Mater. Interfaces 2016, 8, 17728-17737.

Yoon et al., "Self-Healing Polymer Films Based on Thiol-Disulfide Exchange Reactions and Self-Healing Kinetics Measured Using Atomic Force Microscopy" Macromolecules 2012, 45, 142-149.

* cited by examiner

CHEMICALLY OR ENVIRONMENTALLY RESPONSIVE POLYMERS WITH REVERSIBLE MECHANICAL PROPERTIES

PRIORITY DATA

This patent application is a non-provisional application claiming priority to U.S. Provisional Patent App. No. 62/417,856, filed on Nov. 4, 2016, which is hereby incorporated by reference herein. This patent application is also a continuation-in-part of U.S. patent application Ser. No. 15/391,749, filed on Dec. 27, 2016, which is hereby incorporated by reference herein.

FIELD OF THE INVENTION

The present invention generally relates to polymers with reversible properties, and methods of making and using these polymers.

BACKGROUND OF THE INVENTION

Historically, improvements to polymer properties have focused on static properties including strength, thermostability, toughness, and durability. Recent research has broadened to incorporate multifunctionality into polymers that can adapt to their environment, with dynamic properties such as recyclability, remoldability, self-healing, and shape memory. The ability to rework and remold certain polymers is of great interest due to increased awareness of recycling, high cost of materials, and the ability to extend the life of a material through in situ repair. In order to accomplish many of these properties, it is necessary to form and break bonds or crosslinks.

There are two classes of polymer materials that are categorized based on their network structure: thermosets and thermoplastics. Thermosets are polymers that are heated, molded, and cured to form a permanent shape and can no longer be reworked due to network constraints when cured. Thermoplastics will soften upon heating, becoming flowable, which allows them to be remolded multiple times without loss of properties. The biggest distinction between the two classes is the crosslinking architecture of the network. Thermosets tend to have a high density of crosslinking—specifically, interchain covalent bonds—that hold all the polymer chains together. By contrast, thermoplastics are made up primarily of long individual polymer chains that associate together to form a network. This architecture gives thermosets high thermal stability, high rigidity, dimensional stability, and resistance to deformation, which makes them desirable, but removes the ability to recycle, reshape, and repair. Remolding and reshaping thermoplastics is made possible due to non-covalent associations between the polymer chains; however, the reduced number of crosslinks makes the material more vulnerable to creep under stress.

Introducing reversible crosslinking into a polymer network can controllably capture the advantages of both a thermoset and thermoplastic. A conventional problem with crosslinking a network is that the material becomes non-recyclable and non-formable. However, if these crosslinks could be removed, the desirable properties of a thermoplastic-remolding and shaping—are made possible.

Research in reversible crosslinking within materials dates back to the 1960s, where the majority of the work was based on thermally triggered Diels-Alder chemistry. Uniform heating of a part is required, but with Diels-Alder chemistry, uniform heating is generally difficult to achieve for large parts. Moreover, the response is slow and gradual, due to the low thermal conductivity of polymers as well as the bond breakage that occurs over a wide temperature range. Also, structural parts made from this chemistry suffer from heat sensitivity.

New approaches are needed that provide greater flexibility in trigger mechanisms and strategies for crosslinking reversibility. Polymer materials, in addition to being thermoresponsive, can be synthesized to be responsive to chemicals, mechanics, light, and/or electricity.

In chemoresponsive materials, supramolecular-based polymer systems can be altered by components that compete with existing covalent bonds. These systems are difficult and expensive to synthesize, and no clear path can be seen for altering manufactured parts. Polymer materials instead can be synthesized to be responsive to mechanics. Mechanoresponsive materials rely on ultrasonication or other means of mechanical stress to break crosslinking chains. Large material parts would suffer from energy transfer challenges. Reversibility of such systems relies on the re-equilibration of the components with time, a slow and undesirable process. Polymer materials instead can be synthesized to be responsive to electricity. Electroresponsive materials are triggered by an electrical potential that often oxidizes or reduces components.

In view of the shortcomings in the art, what is desired is non-thermal reversible crosslinking in polymers for mechanical tunability, preferably exploiting naturally occurring stimuli, such as natural light. These polymers would be useful for many applications, including (but not limited to) coatings and polymer parts.

SUMMARY OF THE INVENTION

The present invention addresses the aforementioned needs in the art, as will now be summarized and then further described in detail below.

Some variations provide a polymer composition comprising:

(a) a first polymer containing a plurality of ionic species disposed along a chain backbone of the first polymer, wherein the plurality of ionic species has an ionic charge polarity (negative or positive, i.e. non-neutral);

(b) a redox reagent; and (c) a reversible crosslinking agent capable of changing from a first oxidation state to a second oxidation state when in the presence of the redox reagent, wherein the reversible crosslinking agent, in the first oxidation state, has a first coordination number with the ionic species, wherein the reversible crosslinking agent, in the second oxidation state, has a second coordination number with the ionic species, and wherein the first coordination number is different than the second coordination number.

In some embodiments, the first polymer is selected from the group consisting of polyurethanes, polyacrylates, polyamides, polysiloxanes, polycarbonates, and combinations thereof.

In certain embodiments, the first polymer is a segmented polyurethane, such as one that includes:

(a) one or more first soft segments including a first polymer selected from polyesters or polyethers having an average molecular weight from about 200 g/mol to about 20,000 g/mol, wherein the polyethers or polyesters are $(\alpha,\omega)$-hydroxyl-terminated and/or $(\alpha,\omega)$-amine-terminated;

(b) optionally, one or more second soft segments including a second polymer;

(c) the plurality of ionic species contained within the first soft segments and/or contained in copolymer chains that are distinct from the first soft segments;

(d) one or more isocyanate species, or a reacted form thereof, possessing an isocyanate functionality of 2 or greater;

(e) one or more polyol or polyamine chain extenders or crosslinkers, or a reacted form thereof.

In certain embodiments, the first polymer is a fluoropolymer having an average molecular weight from about 500 g/mol to about 20,000 g/mol, wherein the fluoropolymer is (α,ω)-hydroxyl-terminated and/or (α,ω)-amine-terminated, and wherein the fluoropolymer is present in the triblock structure:

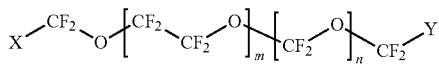

wherein:

X, Y=CH$_2$—(O—CH$_2$—CH$_2$)$_p$-T, and X and Y are independently selected;

p=1 to 50;

T is a hydroxyl or amine terminal group;

m=1 to 100; and n=1 to 100.

The first polymer may be present in the polymer composition at a concentration from about 10 wt % to about 95 wt %, for example.

In some embodiments, the composition further comprises a second polymer, which may be covalently bonded to the first polymer. The second polymer, when present, may be selected from the group consisting of polyethers, polyesters, polysiloxanes, polycarbonates, and combinations thereof.

The ionic species may be selected from carboxylates, sulfonates, phosphates, imidazoliums, or combinations, derivatives, or reaction products thereof. In various embodiments, the ionic species is selected from the group consisting of 2,2-bis(hydroxymethyl)butyric acid, N,N-bis(2-hydroxyethyl)-2-aminoethanesulfonic acid, N-methyl-2,2'-iminodiethanol, 3-dimethylamino-1,2-propanediol, 2,2-bis(hydroxymethyl)propionic acid, 1,4-bis(2-hydroxyethyl) piperazine, 2,6-diaminocaproic acid, N,N-bis(2-hydroxyethyl)glycine, 2-hydroxypropanoic acid hemicalsium salt, (2,2-bis-(1-(1-methyl imidazolium)-methylpropane-1,3-diol bromide), 1,2-bis(2'-hydroxyethyl)imidazolium bromide, and (3-hydroxy-2-(hydroxymethyl)-2-methylpropyl)-3-methyl-1H-3λ$^4$-imidazol-1-ium bromide, dimethylolpropionic acid, N-methyldiethanolamine, N-ethyldiethanolamine, N-propyldiethanolamine, N-benzyldiethanolamine, N-t-butyldiethanolamine, bis(2-hydroxyethyl) benzylamine, bis(2-hydroxypropyl) aniline, and homologues, combinations, derivatives, or reaction products thereof.

In some embodiments, the redox reagent is a reducing agent, and the first coordination number is higher than the second coordination number. In these or other embodiments, the redox reagent is an oxidizing agent, and the first coordination number is lower than the second coordination number.

The redox reagent may include an organic photosensitizer or an inorganic semiconducting photosensitizer, for example. In some embodiments, a photosensitizer is selected from the group consisting of tris(bipyridine)ruthenium(II) chloride, methylene blue, titanium dioxide, and combinations thereof.

In some embodiments, the redox reagent is selected from the group consisting of ascorbic acid, hydrazine, sodium borohydride, benzenediols, and combinations thereof.

The redox reagent may be present in the polymer composition at a concentration from about 0.01 wt % to about 10 wt %, for example.

In some embodiments, one of the oxidation states of the reversible crosslinking agent is +1 or −1, which can be denoted as ±1. Alternatively, or additionally, one of the oxidation states of the reversible crosslinking agent is ±0.5, +1.5, +2, +3, or higher in magnitude.

The reversible crosslinking agent may include a metal ion, such as (but not limited to) a metal ion selected from the group consisting of ions of Cu, Ca, Ni, Hg, Cd, Fe, Co, Ti, Sn, and combinations thereof. The reversible crosslinking agent may include an organic ion (e.g., adipate) or an inorganic ion (e.g., tetrathionate). The reversible crosslinking agent preferably has a redox potential less than 1.0 V.

The reversible crosslinking agent may be present in the polymer composition at a concentration from about 0.1 wt % to about 50 wt %.

In some embodiments, the polymer composition further contains one or more additional components selected from the group consisting of a particulate filler, a substrate adhesion promoter, a pigment, a coloring agent, a plasticizer, a flattening agent, and a flame retardant.

The polymer composition may be disposed in a coating or film, or in any other object.

DETAILED DESCRIPTION OF EMBODIMENTS OF THE INVENTION

Figure 1:
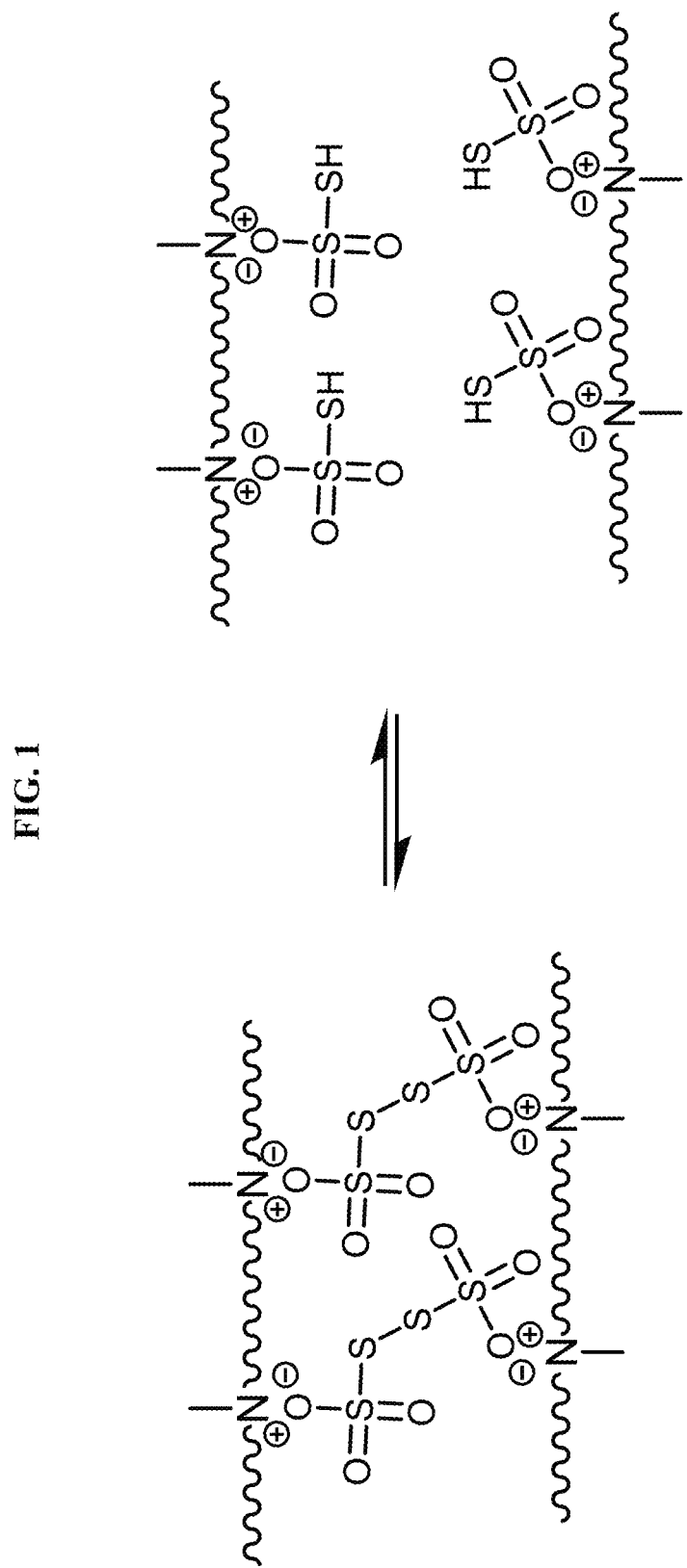
FIG. 1 depicts an exemplary polymer system with reversible interchain ionic crosslinking, using tetrathionate as a reversible crosslinking agent.

The materials, compositions, structures, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique. Concentrations may be intermediate to any recited values in a list of concentrations for a particular component.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

The present invention provides polymer compositions capable of reversible crosslinking by means other than heat for mechanical adjustability. Charged functional groups may be introduced into a polymer network, wherein the charged functional groups are capable of binding to oppositely charged metal ions or other species, which function as a reversible crosslinking agent. Redox-active components (redox reagents) may also be incorporated. The redox-active component is capable of changing the valence of the metal ion or other charged species. As the valence of the metal ion or other charged species increases from +1 (i.e. higher than +1 or more negative than −1), multiple ionic functional groups in the polymer can bind to a single oppositely charged ion, thereby functioning as crosslinks for the polymer network.

In the present invention, "crosslinking" refers to ionic crosslinking, not covalent crosslinking. The crosslinking transition (and therefore change in material properties) is reversible, mediated by chemicals and/or naturally occurring stimuli, such as (but not limited to) sunlight. In some variations, polymer crosslinks are reversible by utilizing light to reversibly oxidize and reduce the metal ions or other charged species, creating a dynamic and reversible bond. It is desirable to harness energy from visible light to induce chemical and physical changes in polymers, in particular by creating and breaking interchain ionic crosslinks. Some embodiments provide an environmentally responsive, reworkable polymer.

In co-pending U.S. patent application Ser. No. 15/391,749 (filed 27 Dec. 2016), it has been shown that by combining ionizable substituents with fluorinated polymers and a hygroscopic polymer, films and coatings are obtained with low friction coefficients. It was also shown that the friction coefficient, as well as the coating's response to humidity, are adjustable by controlling the ionization of the coating. In co-pending U.S. patent application Ser. No. 15/073,610 (filed 17 Mar. 2016), a fluorinated perfluoropolyether (PFPE) and polyethylene glycol (PEG) are combined in a urethane-based segmented copolymer, along with incorporation of charged species into the polymer chain backbone to increase the water-absorbing power (hygroscopic behavior) of the overall structure beyond that of the PEG species. Co-pending and commonly owned U.S. patent application Ser. No. 15/073,610 and U.S. patent application Ser. No. 15/391,749 are hereby incorporated by reference herein, as applicable to some embodiments of the present invention, which is not limited to the chemistry described in U.S. patent application Ser. Nos. 15/073,610 and 15/391,749.

In particular, the present invention is applicable to many polymers, including general polymer classes of both segmented and non-segmented polyurethanes, polyacrylates, polyamides, polysiloxanes, and polycarbonates. To expand the use of such materials to provide desirable properties of reworkability and anti-corrosion, redox-active moieties are incorporated to triggerably alter material properties such as modulus and flexibility.

One route is the incorporation of species which utilize environmentally abundant resources, such as light or other electromagnetic radiation, to promote a redox reaction. Another approach is to incorporate inherently oxidative or reductive species, such as ascorbic acid, into the material to promote a redox reaction. Both of these approaches can mediate a change in the oxidative state of ionic crosslinkers in the material, thereby influencing crosslinking and mechanical properties.

Some aspects of the invention introduce a plurality of ionic species, or precursors thereof, disposed along the chain backbone of a polymer, wherein the ionic species or precursors thereof are covalently bonded to the polymer backbone. A "precursor" of ionic species means a chemical capable of becoming ionically charged. The polymer is combined with a reversible crosslinking agent, such as a metal ion or other charged species, to induce crosslinking. Ionic crosslinking occurs because the ionic species (in the polymer) and the reversible crosslinking agent are oppositely charged.

In some aspects of the invention, ionically crosslinked polymer networks are combined with photosensitive molecules (e.g., dyes) to enable light-induced redox reactions of crosslinking species (e.g., metal ions) to modify mechanical properties of the polymer. In some aspects of the invention, ionically crosslinked polymer networks are combined with redox reagents to modify mechanical properties of the polymer.

A "reversible crosslinking agent" means a chemical that is capable of changing from a first oxidation state to a second oxidation state. In the presence of a polymer containing ionic species having ionic charge polarity, the reversible crosslinking agent has different coordination numbers with the ionic species, when in the first oxidation state compared to the second oxidation state. The difference in coordination numbers is what gives rise to reversible crosslinking.

The "coordination number" of a chemical refers to the number of other atoms to which it is bonded, regardless of type of bond (single versus double bond, etc.). For molecules and polyatomic ions, the coordination number of an atom is determined by simply counting the other atoms to which it is bonded (by either single or multiple bonds). Note that when an ionic species such as COO⁻ is bonded to a reversible crosslinking agent, only the atom directly involved in the bond (one oxygen atom in this case) is counted in the calculation of coordination number.

A reversible crosslinking agent herein may have a coordination number from 0 to 6 (or higher), such as 0, 1, 2, 3, 4, or 5, for example. The coordination number is 0 when the reversible crosslinking agent is in neutral form and not bonded to any ionic species in the polymer backbone. Coordination numbers are non-negative.

Figure 2:
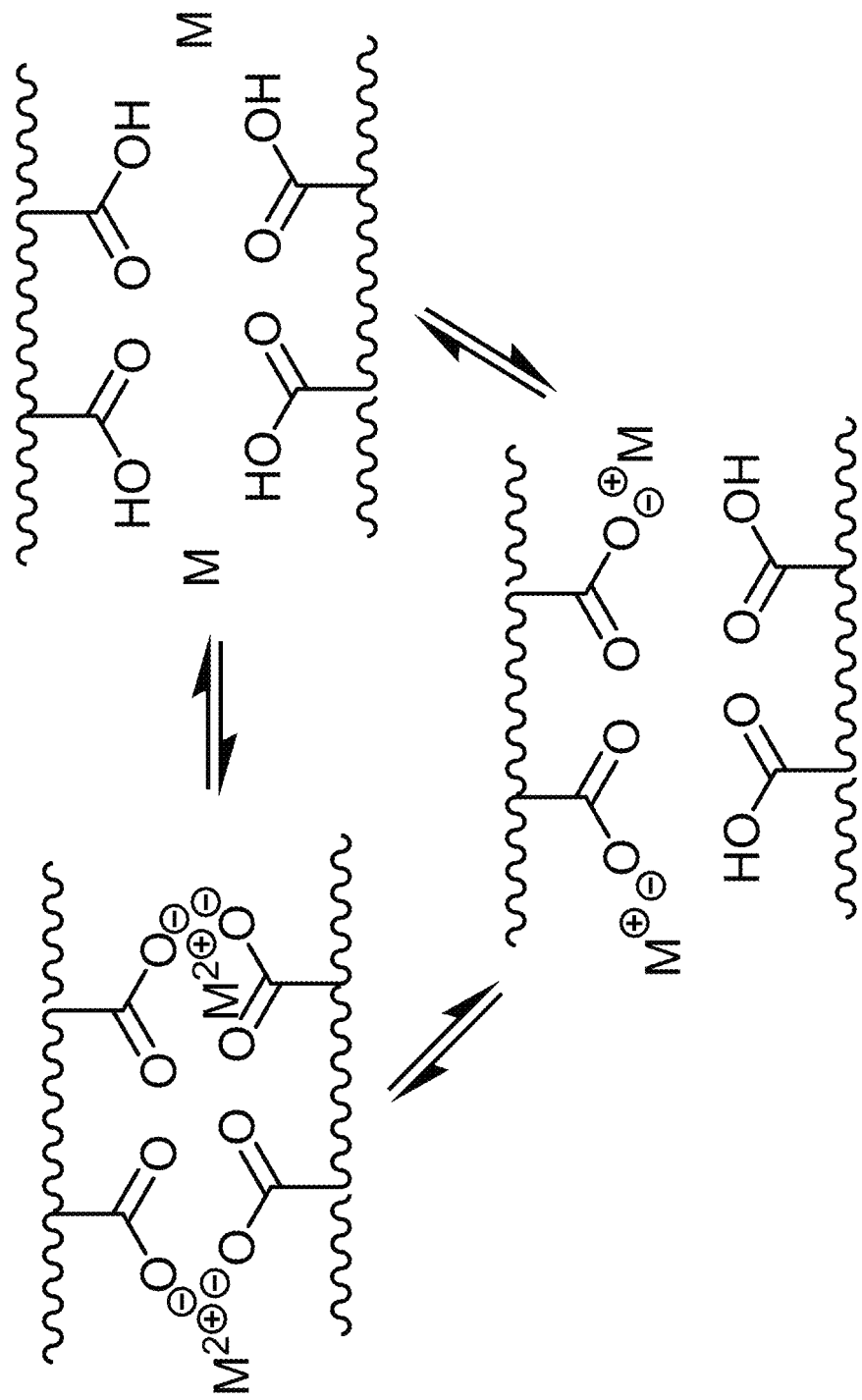
FIG. 2 depicts an exemplary polymer system with reversible interchain ionic crosslinking, using a metal (M) as a reversible crosslinking agent.

As an illustration, in FIG. 2, the reversible crosslinking agent M has a coordination number of 2 in the upper-left reaction state (with M present as $M^{2+}$), 1 in the lower reaction state (with M present as $M^+$), and 0 in the upper-right reaction state (with M present as neutral $M^0$).

An individual molecule of a reversible crosslinking agent will be bonded to a certain number of other atoms (i.e., exactly 0, 1, 2, etc.). However, a plurality of reversible crosslinking agents may have a distribution of coordination numbers within a given polymer, for a variety of reasons. A mixture of reversible crosslinking agents and/or ionic species is one reason that a distribution of coordination numbers may exist. Kinetics and thermodynamics may dictate that some reversible crosslinking agent molecules have bonded to an ionic species, while others have not, again FIG. 2 being an example of a chemical equilibrium. Also, sometimes bonds are not well-defined and there can be partial bonding between a reversible crosslinking agent and an ionic species. Therefore, average coordination numbers may be defined for a selected reversible crosslinking agent. A reversible crosslinking agent, or combination of reversible crosslinking agents, may have an average coordination number from 0 to 6 (or higher), such as about 0, 0.5, 1, 1.5, 2, 2.5, or 3, for example.

The conversion of the reversible crosslinking agent between first and second oxidation states (in either direction), and therefore between first and second coordination numbers, may be assisted by a redox reagent. As intended herein, a "redox reagent" is a chemical that can undergo an oxidation or reduction reaction with a metal ion or other charged species, thereby reducing or oxidizing, respectively, the metal ion or other charged species. A redox reagent is therefore capable of changing the valence (oxidation state) of the metal ion or other charged species. The redox reagent may be a reducing agent, an oxidizing agent, or a chemical that may function as either a reducing agent or an oxidizing agent, depending on external conditions, such as pH, temperature, or electromagnetic radiation. In oxidation-reduction chemistry (also known as redox reactions), a reducing agent reduces another chemical and is itself oxidized. Conversely, an oxidizing agent oxidizes another chemical and is itself reduced.

When the first coordination number is higher than the second coordination number, this means that the reversible crosslinking agent has bonds to more individual atoms of ionic species in the first oxidation state, compared to the second oxidation state. In some embodiments in which the redox reagent is a reducing agent, the first coordination number is higher than the second coordination number. In some embodiments in which the redox reagent is an oxidizing agent, the first coordination number is lower than the second coordination number.

In any of these embodiments, the reversible crosslinking agent may have an average first coordination number from 0 to 6 (or higher), such as about 0, 0.5, 1, 1.5, 2, 2.5, or 3, for example, and an average second coordination number from 0 to 6 (or higher), such as about 0, 0.5, 1, 1.5, 2, 2.5, or 3, for example. The difference between average first and second coordination numbers may be from about ±0.1 to about +3, such as about ±0.5, +1, ±1.5, +2, or +2.5, in various embodiments (positive when the first coordination number is higher than the second coordination number, and negative when the first coordination number is lower than the second coordination number).

FIG. 1 depicts an exemplary approach to achieve reversible interchain ionic crosslinking. In FIG. 1, tetrathionate is a charged species (dianion, $S_4O_6^{2-}$) that serves as a reversible crosslinking agent. The polymer backbone is depicted as a squiggly line. The ionic species that are disposed along the chain backbone of a polymer are depicted as $N^+$. A redox reagent causes the internal S—S bond in tetrathionate to break; the tetrathionate is oxidized so that the −2 negative charge becomes less negative or neutral. Exemplary redox reagents include, but are not limited to, hydrazine, sodium borohydride, or ascorbic acid. This is an equilibrium reaction and can be reversed back to the left-hand side with reduction.

FIG. 2 depicts another exemplary approach to achieve reversible interchain ionic crosslinking. In FIG. 2, a metal, depicted as M, is a reversible crosslinking agent. The polymer backbone is depicted as a squiggly line. The ionic species that are disposed along the chain backbone of a polymer are shown, without limitation, as carboxylate ions (—COO⁻) with ionic charges of −1. Reversible redox pathways are shown in which metal divalent ion $M^{2+}$ may be reduced to monovalent ion $M^+$ and/or to neutral metal M. Metal monovalent ion $M^+$ may also be reduced to neutral metal M. Conversely, neutral metal M may be oxidized to metal monovalent ion $M^+$ and/or metal divalent ion $M^{2+}$, and metal monovalent ion $M^+$ may be oxidized to, metal divalent ion $M^{2+}$, because all the reactions are reversible with appropriate redox reagents.

Figure 3:
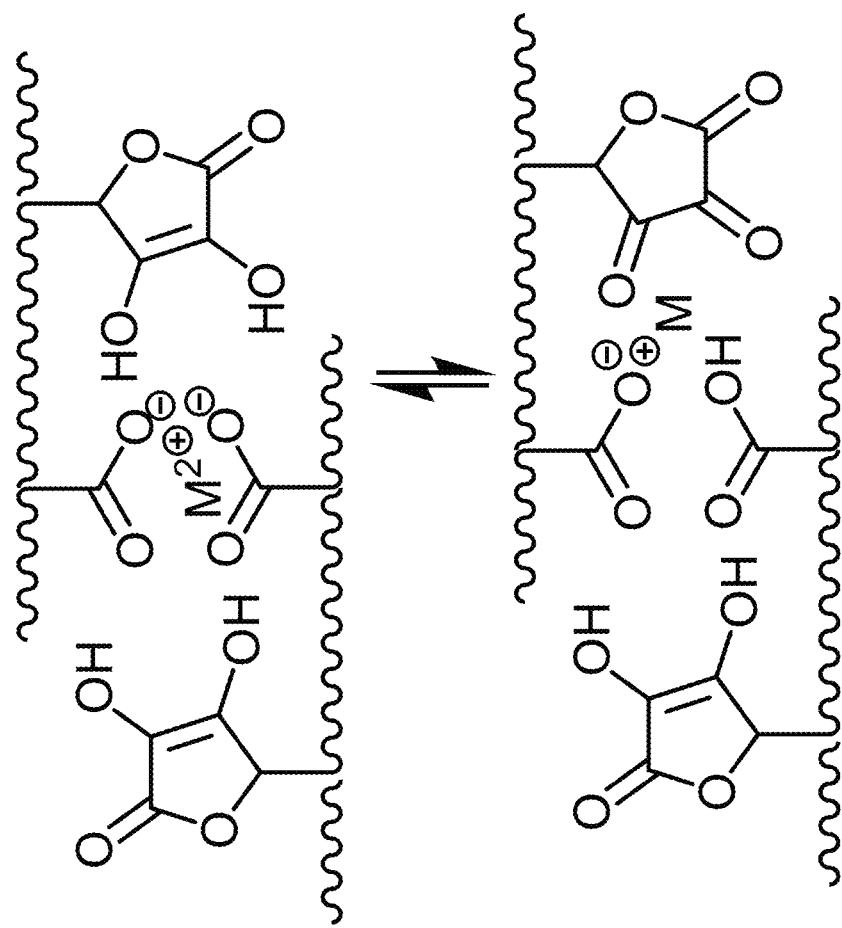
FIG. 3 depicts an exemplary polymer system in which the polymer network contains both an ionic species and a redox reagent, along with a metal (M) as a reversible crosslinking agent.

In some embodiments of the invention, an ionic species and a redox reagent are both integrated into the polymer backbone. FIG. 3 depicts an exemplary embodiment in which the polymer network contains both an ionic species (carboxylate ions, —COO⁻) and cyclic groups derived from ascorbic acid, as a redox reagent. The polymer backbone is depicted as a squiggly line. In FIG. 3, a metal, depicted as M, is a reversible crosslinking agent. The metal ion may be reduced from divalent ion ($M^{2+}$) to monovalent ion ($M^+$) by transfer of hydrogen atoms from the redox reagent to the ionic species. The carboxylate ions are oxidized into neutral carboxylic acid groups.

In some embodiments, ionic functional groups are introduced into segmented polyurethane or polyurea systems. These species demonstrate strong hydrogen bonding potential between them and as a result can create strong associative forces between the chains. In order to produce elastomeric materials, regions of highly flexible and weakly interacting chains (soft segments) are incorporated with strongly associating elements (hard segments) in a segmented copolymerization scheme. Segmented copolymers provide a synthetic route toward block architectures using segments with vastly differing properties. Such synthesis typically results in chains that possess alternating hard and soft segments composed of regions of high urethane bond density and the chosen soft segment component (e.g., polyol or hygroscopic element), respectively. This covalent linkage of dissimilar hard and soft blocks drives the systems to microphase separation and creates regions of flexible soft blocks surrounding regions of hard blocks. The associative forces among the hard segments prevent flow under stress and can produce elastomeric materials capable of displaying high elongation and tensile strength.

Within this segmented copolymer framework, charged groups may be incorporated along the chain backbone at various locations, depending on the order of addition. The primary requirement is two or more isocyanate reactive groups, such as alcohol or amine moieties. Specific examples include 2,2-bis(hydroxymethyl)butyric acid, N,N-bis(2-hydroxyethyl)-2-aminoethanesulfonic acid, N-methyl-2,2'-iminodiethanol, 3-dimethylamino-1,2-propanediol, 2,2-bis(hydroxymethyl)propionic acid, 1,4-bis(2-hydroxyethyl)piperazine, 2,6-diaminocaproic acid, N,N-bis(2-hydroxyethyl)glycine, 2-hydroxypropanoic acid hemicalsium salt, (2,2-bis-(1-(1-methyl imidazolium)-methylpropane-1,3-diol bromide), 1,2-bis(2'-hydroxyethyl)imidazolium bromide, and (3-hydroxy-2-(hydroxymethyl)-2-methylpropyl)-3-methyl-1H-3$\lambda^4$-imidazol-1-ium bromide.

Crosslinking of the ionic species may occur during the original curing of the material and/or may be introduced in a post-cure step. The primary requirement of a crosslinking agent is the ability to form a non-covalent, ionic bond, with 2 or more charged species contained on separate polymer backbone chains (so that crosslinking occurs). Specific examples of crosslinking agents include divalent metal cations (e.g., $Ca^{2+}$, $Cu^{2+}$, and $Fe^{2+}$) and difunctional ionic compounds (e.g., tetrathionate). Preferably, the crosslinking agent also possesses the ability to undergo a redox reaction which causes dissociation of the ionic bond between the crosslinking agent and the ionic species on the polymer backbone.

Some variations provide a polymer composition comprising:

(a) a first polymer containing a plurality of ionic species disposed along the chain backbone of the first polymer, wherein the plurality of ionic species has an ionic charge polarity that is negative or positive;

(b) a redox reagent; and (c) a reversible crosslinking agent capable of changing from a first oxidation state to a second oxidation state when in the presence of the redox reagent, wherein the reversible crosslinking agent, in the first oxidation state, has a first coordination number with the ionic species, wherein the reversible crosslinking agent, in the second oxidation state, has a second coordination number with the ionic species, and wherein the first coordination number is different than the second coordination number.

In some embodiments, the first polymer is selected from the group consisting of polyurethanes, polyacrylates, polyamides, polysiloxanes, polycarbonates, and combinations thereof.

In certain embodiments, the first polymer is a segmented polyurethane, such as one that includes:

(a) one or more first soft segments including a first polymer selected from polyesters or polyethers having an average molecular weight from about 200 g/mol to about 20,000 g/mol, wherein the polyethers or polyesters are ($\alpha,\omega$)-hydroxyl-terminated and/or ($\alpha,\omega$)-amine-terminated;

(b) optionally, one or more second soft segments that includes a second polymer, such as polyesters or polyethers that are ($\alpha,\omega$)-hydroxyl-terminated and/or ($\alpha,\omega$)-amine-terminated;

(c) the plurality of ionic species contained within the soft segments and/or contained in copolymer chains that are distinct from the soft segments;

(d) one or more isocyanate species, or a reacted form thereof, possessing an isocyanate functionality of 2 or greater;

(e) one or more polyol or polyamine chain extenders or crosslinkers, or a reacted form thereof.

In some embodiments, the composition further comprises a second polymer, which may be covalently bonded to the first polymer. The second polymer may be selected from the group consisting of polyethers, polyesters, polysiloxanes, polycarbonates, and combinations thereof.

In certain embodiments, the first polymer may also be selected from the group consisting of polyethers, polyesters, polysiloxanes, polycarbonates, and combinations thereof. Polycarbonates may be in the form of polycarbonate diols.

In the polymer composition, the first polymer may be present from about 10 wt % to about 99 wt %, such as about 20, 30, 40, 50, 60, 70, 80, 90, or 95 wt % based on total weight of the polymer composition. A second polymer, if included, may be present from about 1 wt % to about 50 wt %, such as about 5, 10, 20, 30, or 40 wt % of the polymer composition.

The ionic species (in the polymer chain) may be selected from carboxylates, sulfonates, phosphates, imidazoliums, or combinations, derivatives, or reaction products thereof. In various embodiments, the ionic species is selected from the group consisting of 2,2-bis(hydroxymethyl)butyric acid, N,N-bis(2-hydroxyethyl)-2-aminoethanesulfonic acid, N-methyl-2,2'-iminodiethanol, 3-dimethylamino-1,2-propanediol, 2,2-bis(hydroxymethyl)propionic acid, 1,4-bis(2-hydroxyethyl)piperazine, 2,6-diaminocaproic acid, N,N-bis(2-hydroxyethyl)glycine, 2-hydroxypropanoic acid hemicalsium salt, (2,2-bis-(1-(1-methyl imidazolium)-methylpropane-1,3-diol bromide), 1,2-bis(2'-hydroxyethyl)imidazolium bromide, and (3-hydroxy-2-(hydroxymethyl)-2-methylpropyl)-3-methyl-1H-3$\lambda^4$-imidazol-1-ium bromide, dimethylolpropionic acid, N-methyldiethanolamine, N-ethyldiethanolamine, N-propyldiethanolamine, N-benzyldiethanolamine, N-t-butyldiethanolamine, bis(2-hydroxyethyl) benzylamine, bis(2-hydroxypropyl) aniline, and homologues, combinations, derivatives, or reaction products thereof.

The ionic species may be present on or in the polymer backbone at various locations and frequencies, such as at every monomer position (i.e. all monomers charged, as in certain polyelectrolytes), at alternating monomers, periodically, or randomly. Here, "polymer backbone" refers to one or more polymer chains that may be present in the polymer composition. In preferred embodiments, ionic species are present in at least two distinct polymer chains of the polymer backbone, so that crosslinking rather chain folding occurs.

The ionic species may be present as or in pendant groups covalently bonded to the polymer backbone, which pendant groups may be located at every monomer, or less than every monomer. The pendant groups may be pendant chains of another polymer or oligomer, in certain embodiments.

A first portion of ionic species may be present in the polymer backbone itself, while a second portion of ionic species (with the same charge polarity as the first ionic species) is present in pendant groups covalently bonded to the polymer backbone. In some embodiments in which a polymer contains pendant groups, there is a net positive or negative charge associated with a pendant group while the actual electron distribution may vary, such that at least a portion of the charge can be considered to be at the monomer (backbone) position. In this case the ionic species can be considered to be the pendant group, or the polymer repeat unit containing the pendant group.

Within the first polymer, the ionic species may be present from about 0.1 wt % to about 50 wt %, such as about 0.5, 1, 2, 5, 10, 20, 30, or 40 wt % based on the weight of the first polymer itself. The mole ratio of ionic species (regardless of charge) to monomer (in polymer backbone), i.e. the number of ionic species per monomer, may vary from about 0.001 to 1, such as about 0.01, 0.05, 0.1, 0.2, 0.3, 0.4, or 0.5. On the basis of the overall polymer composition, the ionic species may be present from about 0.5 wt % to about 15 wt %, such as about 1, 2, 5, or 10 wt % of the polymer composition, for example.

In some embodiments, the redox reagent is a reducing agent, and the first coordination number is higher than the second coordination number. A "reducing agent" (also called a "reductant" or "reducer") is an element or compound that donates an electron to another chemical species in a redox chemical reaction. A wide variety of chemical reducing agents may be employed. Some examples are organic acids (e.g., ascorbic acid) and catechols (e.g., 1,2-dihydroxybenzene). In these or other embodiments, the redox reagent is an oxidizing agent, and the first coordination number is lower than the second coordination number.

The redox reagent may include an organic photosensitizer or an inorganic semiconducting photosensitizer, for example. A "photosensitizer" is a molecule that produces a chemical change in another molecule, such as oxidation or reduction, in a photochemical process induced by light. Photosensitizers (when present) may include at least one organic photosensitizer, such as (but not limited to) photosensitive organic dyes, e.g. tris(bipyridine)ruthenium(II) ([Ru(bpy)3]$^{2+}$) chloride, methylene blue (methylthioninium chloride), or triphenylamine-based organic dyes. Alternatively, or additionally, photosensitizers may include at least one inorganic photosensitizer, such as (but not limited to) photosensitive inorganic dyes (e.g., transition-Metal-Complex cationic dyes), metal oxides, or semiconductors. An exemplary inorganic photosensitizer is titanium dioxide.

A photosensitizer may be provided in addition to one or more oxidizable or reducible species, such as (but not limited to) ethanol, dimethylamine, or dimethylaniline. That is, the polymer composition may include an organic photosensitizer or an inorganic semiconducting photosensitizer, for example, in addition to a species that can be oxidized or reduced via the photosensitizer when in the presence of light.

In some embodiments, the redox reagent requires light for activation, while in other embodiments, the redox reagent does not require light for activation. Certain redox reagents will work without light but will be more effective (e.g., faster reduction or oxidation of ions) with at least some light present.

Photosensitive dyes have the ability to absorb visible light, promoting an electron from ground state to an excited state. Reversible crosslinking agents may be selected with desirable redox potentials with respect to photosensitive dyes or other photosensitizers.

Some embodiments utilize aspects of the disclosure in Oster et al., "Photoreduction of metal ions by visible light," *J. Am. Chem. Soc.*, 1959, 81 (21), pages 5543-5545, which is hereby incorporated by reference herein for its teaching of the reduction of various metal ions with a photoreducing dye in the presence of a sacrificial anion under visible light, and for its teaching of various photosensitive dyes. This technique may be used to reduce metal ions embedded within polymer films and coatings disclosed herein.

Some variations provide a polymer composition comprising:

(a) a polymer matrix containing one or more ionic species;

(b) one or more photosensitizers, along with one or more oxidizable or reducible species (e.g., ethanol, dimethylamine, or dimethylaniline), collectively serving as a redox reagent; and (c) one or more metal ions capable of reversibly changing from a first oxidation state to a second oxidation state when in the presence of the photosensitizers and light, wherein the metal ions, in the first oxidation state, have a first coordination number with the ionic species, wherein the metal ions, in the second oxidation state, have a second coordination number with the ionic species, and wherein the first coordination number is greater than the second coordination number.

In some embodiments, the redox reagent is selected from the group consisting of ascorbic acid, hydrazine, sodium borohydride, benzenediols, and combinations thereof.

The redox reagent may be present in the polymer composition itself, or may be provided at a later time. For example, gaseous oxidizing agents such as oxygen or ozone, or gaseous reducing agents such as hydrogen, carbon monoxide, or syngas, may be introduced to the polymer composition. It is also possible to incorporate a triggerable redox reagent in the polymer composition, wherein the triggerable redox reagent is responsive to an external activating signal that could be magnetic or electromagnetic, for example.

The redox reagent, or a reacted form thereof, may be present from about 0.01 wt % to about 20 wt %, such as about 0.05, 0.1, 0.2, 0.5, 1, 1.5, 2, 3, 4, 5, 10, or 15 wt % of the polymer composition. From 0 to 100% of the redox agent may be present in initial form (e.g., as an oxidizing agent or a reducing agent). From 0 to 100% of the redox agent may be present in reacted form (e.g., reduced, when initially present an oxidizing agent, or oxidized, when initially present a reducing agent).

In some embodiments, one of the oxidation states of the reversible crosslinking agent is +1 or −1, which can be denoted as ±1. Alternatively, or additionally, one of the oxidation states of the reversible crosslinking agent is ±0.5, ±1.5, ±2, ±3, or higher in magnitude. In some embodiments, the second oxidation state is one unit of charge less than the first oxidation state. In certain embodiments, the second oxidation state is two, three, or more units of charge less than the first oxidation state. A range of oxidation states may be present, in which case the average second oxidation state may be about 0.5, 1.0, 1.5, 2.0, 2.5, 3.0, or more units of charge less than the average first oxidation state.

The reversible crosslinking agent may include a metal ion, such as (but not limited to) a metal ion selected from the group consisting of ions of Cu, Ca, Ni, Hg, Cd, Fe, Co, Ti, Sn, and combinations thereof. Metal ions, generally speaking, are both reducible and oxidizable, which imparts crosslinking reversibility to the polymer. Metal ions may generally be selected from alkali metals, alkaline earth metals, transition metals (including Cd, Zn, and Hg), or post-transition metals.

In some embodiments, the reversible crosslinking agent may include an organic ion, such as but not limited to adipate. Adipate is an ion of adipic acid or an adipate salt. Adipate may be present in anionic form ($HO_2C(CH_2)_4CO_2^-$) and/or in dianionic form ($^-O_2C(CH_2)_4CO_2^-$). The adipate may be introduced to the polymer composition as a salt, such as sodium adipate or potassium adipate. Other organic ions or organic salts may be employed. Preferably, the organic ion or salt is both reducible and oxidizable, to impart crosslinking reversibility to the polymer.

In some embodiments, the reversible crosslinking agent may include an inorganic ion, such as but not limited to tetrathionate. The tetrathionate anion, $S_4O_6^{2-}$, is a sulfur oxoanion derived from the compound tetrathionic acid, $H_2S_4O_6$. Two of the sulfur atoms present in the ion are in oxidation state 0 and two are in oxidation state +5. The molecular structure of tetrathionate, as a reversible crosslinking agent in a polymer in some embodiments, is shown in FIG. 1. Tetrathionate is one of the polythionates, and other polythionates may be used as the reversible crosslinking agent. Other inorganic ions or inorganic salts may be employed. Preferably, the inorganic ion or salt is both reducible and oxidizable, to impart crosslinking reversibility to the polymer.

In some embodiments, the reversible crosslinking agent is "difunctional", which means that it contains a net divalent (or higher) charge that is separated atomically within the molecule. Adipate and tetrathionate, discussed above, are both examples of difunctional, reversible crosslinking agents. The charges in a difunctional molecule may be present at atoms disposed on opposite ends of the molecule (as in the case of adipate), or one charge may be at the end of the molecule while another is at an atomic center, for example. Note that a metal ion $M^{2+}$ is classified as divalent but is not difunctional, because the charge is not separated on different atoms.

Preferably, the reversible crosslinking agent is readily reducible and/or oxidizable, with a low redox potential, which is a measure of the tendency of a chemical species to acquire electrons and thereby be reduced, or to give up electrons and thereby be oxidized. "Reduction potential" is the tendency of a chemical species to acquire electrons and be reduced. The reduction potential is measured in volts; the more positive the reduction potential, the greater is the species' affinity for electrons and tendency to be reduced (oxidation state becomes less positive or more negative). By sign convention, a negative reduction potential means a high tendency to give up electrons and be oxidized.

In this invention, the charge polarities may all be reversed, with the same effect achieved. Therefore, reference will be made to "redox potential" as an absolute value of reduction potential. For example, a redox potential of 0.5 V refers to ±0.5 V, i.e. either a reduction potential of +0.5 V or a reduction potential of −0.5 V (which equates to an oxidation potential of +0.5 V). A redox potential less than 0.5 V refers to a reduction potential less than +0.5 V, or a reduction potential less negative than −0.5 V. That is, the reduction potential $E_h$ in this example is in a range given by either $0<E_h<0.5$ V or $0>E_h>-0.5$ V.

The redox potential of the reversible crosslinking agent is preferably less than 1.0 V, more preferably less than 0.5 V, even more preferably less than 0.3 V. In various embodiments, the redox potential of the reversible crosslinking agent is about, or less than about, 1.0, 0.9, 0.8, 0.7, 0.6, 0.5, 0.4, 0.3, 0.2, 0.1, or 0.05 V. As an example, the tetrathionate ion utilized in some embodiments has a redox potential of about 0.2 V.

The reversible crosslinking agent may be present from about 0.1 wt % to about 50 wt %, such as about 0.2, 0.5, 1, 2, 5, 10, 20, 30, or 40 wt %. The reversible crosslinking agent may be present in various oxidation states. From 0 to 100% of the reversible crosslinking agent may be present in the first oxidation state. From 0 to 100% of the reversible crosslinking agent may be present in the second oxidation state, and/or in another oxidation state different from the first oxidation state.

The crosslinks are reversible by chemical, electrical, electromagnetic, electrochemical, electromechanical, or other non-thermal means. Combinations of techniques may be employed.

Some embodiments employ light, or other electromagnetic radiation, to induce the creation and/or dissociation of a crosslink. As intended herein, "light" means the ultraviolet and/or visible regions of electromagnetic radiation, with wavelengths of about 10 nm to about 1000 nm, such as about 100 nm to about 700 nm.

Some preferred embodiments utilize sunlight, which is a clean, abundant energy source. Sunlight (solar light) is therefore a convenient, low-cost source of visible light to induce chemical and physical changes in polymer compositions disclosed herein. As is known, solar light is not monochromatic. The sun emits light primarily in the visible spectrum (about 400-700 nm), but it also emits photons at other wavelengths, starting at about 200 nm and exceeding 2000 nm.

An alternative to sunlight is artificial light, from a laser source, ambient source (other than the sun), or other source. The light may be transmitted through space or through a material such as an optical fiber, for exposure to the polymer. In some embodiments, a light source is spatially dividing into one or more individual beams, focusing on a selected region of the polymer (e.g., for directed healing of cracks). Certain embodiments utilize laser-guided healing of selected locations in a polymer system. The laser source is not limited to wavelengths of ordinary light.

In some embodiments, the light exposure is temporary, to cause a property change. The light exposure may be periodic, i.e. with some defined interval between light treatments, or non-periodic (e.g., on-demand). Constant light exposure may be utilized, to maintain thermoplastic properties even in the presence of random oxidants which would otherwise tend to reverse the polymer to thermoset properties, for example.

In addition to such electromagnetic treatment, electrical, electrochemical, or electromechanical techniques may be utilized to change the reversible crosslinking agent capable from a first oxidation state to a second oxidation state. Direct electrical current (or alternating current) may be supplied to electrodes disposed with the polymer, such as in layers, to reduce the reversible crosslinking agent (or to extract electrons, to oxidize the reversible crosslinking agent). Photovoltaic-active regions may be included in the polymer, configured to convert incoming light into electricity that reduces the reversible crosslinking agent.

Other techniques to induce crosslink reversibility include, but are not limited to, controlling reaction conditions or environmental conditions such as pH, humidity, pressure, temperature, or a combination thereof. Centrifugation, ultrasonication, or other mechanical treatments may be included.

Generally speaking, thermal energy and mechanical forces may optionally be utilized to assist in crosslink reversibility but are not necessary. That is, the polymer compositions disclosed herein generally do not require heating or cooling to break or form crosslink bonds, but temperature control may still be included in these methods, such as to optimize rates of reactions or mass transfer. Light-activated treatment may cause local heating that can be removed by cooling, if needed. Thermal treatments may be applied to the polymers for reasons other than crosslink chemistry, including to produce parts, melt polymer for recycling, and so on.

In some embodiments, the polymer composition further contains one or more additional components selected from the group consisting of a particulate filler, a substrate adhesion promoter, a pigment, a coloring agent, a plasticizer, a flattening agent, and a flame retardant.

The polymer composition may be disposed in a coating or film, or in any other object. Other objects include, but are not limited to, containers, pipes, engineered parts, circuit boards, and consumer products. In certain embodiments, an object containing a polymer composition disclosed herein may be reversibly crosslinked (or uncrosslinked) to repair the object or adjust its properties, for example.

As used herein, an "ionic species" refers to ionized or ionizable molecules which may be in the form of, or precursors to, anions, cations, or zwitterions. Ionic species may include (or be ionizable to) a full charge such as −1, −2, −3, +1, +2, +3, a fractional charge such as −0.5, +0.5, −1.5 or +1.5, or a partial charge which in principle may be any fraction of charge. "Ionizable" means that the molecule is neutral, i.e. net charge of 0, but capable of forming an anion, cation, or zwitterion; or that it is ionized but is capable of forming an anion, cation, or zwitterion having a larger magnitude of charge.

In some embodiments, the ionic species are present as or in high-molecular-weight polyelectrolytes or polyelectrolyte precursors. A "polyelectrolyte" is defined as a macromolecule in which a substantial portion of the constitutional units have ionizable or ionic groups, or both.

Some embodiments incorporate small-molecule charged groups (e.g., polymer pendant groups) disposed covalently along the chain backbone at various locations, depending on the order of addition. In these embodiments, the electrical charge is typically present within the pendant group, not in the polymer backbone itself. Regardless of the distribution of electrons, charged polymer pendant groups are considered to be ionic species disposed along the chain backbone of the polymer.

In some embodiments, the ionic species are present as or in ionomers. An "ionomer" is a polymer composed of ionomer molecules. An "ionomer molecule" is a macromolecule in which a significant (e.g., greater than 1, 2, 5, 10, 15, 20, or 25 mol %) proportion of the constitutional units have ionizable or ionic groups, or both. Some embodiments employ urethane-based ionomers capable of changing their crosslinked state under the influence of a change in counterion valance. In some embodiments, an ionomer is a polymer that comprises repeat units of both electrically neutral repeating units and a fraction of ionized units (such as about 1-15 mol %) covalently bonded to the polymer backbone as pendant group moieties. This means that ionomers are commonly copolymers of the neutral segments and the ionized units, which may consist of (as an example) carboxylic acid groups.

Ionomer synthesis may include the introduction of acid groups to the polymer backbone and the neutralization of some of the acid groups by a metal cation. In some embodiments, the groups introduced are already neutralized by a metal cation. The introduction of acid groups may be achieved by copolymerizing a neutral non-ionic monomer with a monomer that contains pendant acid groups. Alternatively, acid groups may be added to a non-ionic polymer through post-reaction modifications. In some embodiments, the acid form of the copolymer is synthesized (i.e. all of the acid groups are neutralized by hydrogen cations) and the ionomer is formed through subsequent neutralization by a metal cation. An acid copolymer may be melt-mixed with a basic metal, or neutralization may be achieved through solution processes, for example. The identity of the neutralizing metal cation has an effect on the physical properties of the ionomer.

The classification of a polymer as an ionomer versus polyelectrolyte (see below) depends on the level of substitution of ionic groups as well as how the ionic groups are incorporated into the polymer structure. For example, polyelectrolytes also have ionic groups covalently bonded to the polymer backbone, but have a higher ionic group molar substitution level (such as greater than 50 mol %, usually greater than 80 mol %).

Polyelectrolytes (charged molecular chains) are polymers whose repeating units bear an electrolyte group. Polycations and polyanions are polyelectrolytes. These groups dissociate in aqueous solutions, making the polymers charged. Polyelectrolyte properties are thus similar to both electrolytes (salts) and polymers and are sometimes called polysalts. Like salts, their solutions are electrically conductive. Like polymers, their solutions are often viscous.

Polyelectrolytes can be divided into weak and strong types. A strong polyelectrolyte is one which dissociates completely in solution for most reasonable pH values. A weak polyelectrolyte, by contrast, has a dissociation constant in the range of about 2 to 10, meaning that it will be partially dissociated at intermediate pH. Thus, weak polyelectrolytes are not fully charged in solution, and their fractional charge can be modified by changing the solution pH, counterion concentration, or ionic strength.

A polyacid is a polyelectrolyte composed of macromolecules containing acid groups on a substantial fraction of the constitutional units. For example, the acid groups may be —COOH, —SO$_3$H, or —PO$_3$H$_2$. Polyelectrolytes which bear both cationic and anionic repeat groups are called polyampholytes.

A zwitterion is a neutral molecule with a positive as well as a negative electrical charge. Multiple positive and negative charges may be present. Zwitterions are sometimes also called inner salts. Unlike simple amphoteric compounds that might only form either a cationic or anionic species depending on external conditions, a zwitterion simultaneously has both ionic states in the same molecule.

In addition to one or more ionic species, various counterions may be present. There may be a net charge associated with the ionic species, or there may be charge neutrality if a sufficient amount of counterions, such as metal ions, are ionically associated with the ionic species. It is possible for there to be partial neutralization due to counterions, so that the effective charge is something between the ionic species charge and 0. It is also possible for there to be, at least for some period of time, an excess of counterions so that the effective charge is greater than the ionic species charge (i.e. more positive or more negative when the ionic species is cationic or anionic, respectively).

Ionic constituents in polymers are typically both water-absorbing and bound with counterions. When incorporated into polymer systems, ionic species have the ability to change the bulk and surface properties in response to materials bound to the network. These charged constituents, when incorporated into the polymer coating, can enable reversible interchain crosslinking in some embodiments.

Upon addition into the polymer, the functional groups may be protonated and uncharged, allowing the network to be held together by the hydrogen bonding in hard-segment domains of concentrated urethane bonds, in certain embodiments.

For example, to crosslink polymer films with metal ions, films may be soaked in metal-containing solutions, such as calcium hydroxide (Ca(OH)$_2$) solutions. Calcium ions are known to bind very tightly to carboxylic acid groups where their divalent nature can act as a bridge between two monovalent carboxylate species to crosslink chains into an overall network. The material may subsequently be soaked in an acidic solution, such as hydrochloric acid solutions, to protonate the carboxylic acid groups for removal of Ca$^{2+}$ ions, in reversible crosslinking.

The reversible crosslinking in this invention is primarily due to ionic crosslinking, not covalent crosslinking. Partial atomic charges can be used to quantify the degree of ionic versus covalent bonding of any particular compound that is selected as, or may be a candidate for, an ionic species. Partial charges for a given ionic species can be estimated in multiple ways, such as: densities; measured dipole moments; the Extended Born thermodynamic cycle, including an analysis of ionic bonding contributions; the influence of coordination numbers and aggregate state of a given compound on atomic charges; the relationship of atomic charges to melting points, solubility, and cleavage energies for a set of similar compounds with similar degree of covalent bonding; the relationship of atomic charges to chemical reactivity and reaction mechanisms for similar compounds; or the relationship between chemical structure and atomic charges for comparable compounds with known atomic charges.

Partial charges in ionic species may be determined by population analysis of wavefunctions (e.g., Mulliken population analysis, Coulson's charges, etc.); partitioning of electron density distributions (e.g., Bader charges, Hirshfeld charges, Politzer's charges, etc.); charges derived from dipole-dependent properties (e.g., dipole charges, dipole derivative charges, Born, Callen, or Szigeti effective charges, etc.); charges derived from electrostatic potential (e.g., Chelp, Merz-Singh-Kollman, etc.); charges derived from spectroscopic data (e.g., charges from infrared intensities, X-ray photoelectron spectroscopy, X-ray emission spectroscopy, X-ray absorption spectra, UV-vis intensities of transition metal complexes, etc.); charges from other experimental data (e.g., charges from bandgaps or dielectric constants, apparent charges from the piezoelectric effect, charges derived from adiabatic potential energy curves, or electronegativity-based charges), or formal charges.

Variations of the present invention are premised on the incorporation of ions into polymers to alter polymer mechanical properties, such as the modulus and flexibility of these materials. The polymers may be present in coatings, for example. In some embodiments, ionizable substituents are combined with fluorinated polymers and hygroscopic polymers to obtain films or coatings with low friction coefficients. The coating response to humidity may be adjusted by controlling the ionization of the coating.

In some embodiments of the present invention, charged functional groups are incorporated into a polymer network, wherein the charged functional groups are capable of binding to metal ions. As the metal-ion charge increases, multiple functional groups can bind to a single ion, thereby acting as crosslinks within the polymer network. Ionic crosslinking with metal species of valence charges >1 is demonstrated herein, showing a reversible change in mechanical properties by reducing the metal species chemically or with light, not by heating/cooling the polymer.

Some embodiments employ photosensitizers in coatings. Some embodiments combine photosensitizers with ion-containing polymers, to effect a light-mediated chemical and/or mechanical transition. The chemical and/or mechanical transition can give an anti-corrosion effect, an anti-fouling effect, a "self-healing" effect (also known as "re-mendability"), and/or switchability between mechanical properties associated with thermoplastic and thermoset plastics, for example.

In some embodiments of the invention, the polymer matrix contains a substantially continuous matrix containing a first component; and, dispersed within the matrix, a plurality of inclusions containing a second component that is chemically different than the first component, wherein one of the first component or the second component is a first polymer having a surface energy between about 5 mJ/m$^2$ to about 50 mJ/m$^2$, and the other of the first component or the second component is a second polymer containing the one or more ionic species, and wherein the first polymer and the second polymer are chemically connected ionically or covalently.

The first polymer may be a fluoropolymer selected from the group consisting of polyfluoroethers, perfluoropolyethers, polyfluoroacrylates, polyfluorosiloxanes, and combinations thereof.

In certain embodiments, the first polymer is a fluoropolymer having an average molecular weight from about 500 g/mol to about 20,000 g/mol, wherein the fluoropolymer is (α,ω)-hydroxyl-terminated and/or (α,ω)-amine-terminated, and wherein the fluoropolymer is present in the triblock structure:

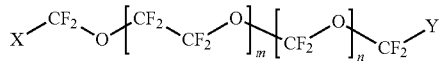

wherein:
X, Y=CH$_2$—(O—CH$_2$—CH$_2$)$_p$-T, and X and Y are independently selected;
p=1 to 50;
T is a hydroxyl or amine terminal group;
m=1 to 100; and
n=1 to 100.

The second polymer (when present) may be selected from the group consisting of polyethers, polyesters, polysiloxanes, polycarbonates, polyelectrolytes, and combinations thereof. In some embodiments, the second polymer includes a material selected from the group consisting of poly(acrylic acid), poly(ethylene glycol), poly(2-hydroxyethyl methacrylate), poly(vinyl imidazole), poly(2-methyl-2-oxazoline), poly(2-ethyl-2-oxazoline), poly(vinylpyrolidone), cellulose, modified cellulose, carboxymethyl cellulose, hydroxyethyl cellulose, hydroxypropyl cellulose, methyl cellulose, hydrogels, PEG diacrylate, monoacrylate, and combinations thereof.

The ionic species includes one or more species selected from the group consisting of an ionizable salt, an ionizable molecule, a zwitterionic component, a polyelectrolyte, an ionomer, and combinations thereof, in various embodiments.

In certain embodiments, the ionic species is selected from the group consisting of (2,2-bis-(1-(1-methyl imidazolium)-methylpropane-1,3-diol bromide), 1,2-bis(2'-hydroxyethyl) imidazolium bromide, (3-hydroxy-2-(hydroxymethyl)-2- methylpropyl)-3-methyl-1H-3λ$^4$-imidazol-1-ium bromide, 2,2-bis(hydroxymethyl)butyric acid, N,N-bis(2-hydroxyethyl)-2-aminoethanesulfonic acid, N-methyl-2,2'-iminodiethanol, 3-dimethylamino-1,2-propanediol, 2,2-bis(hydroxymethyl)propionic acid, 1,4-bis(2-hydroxyethyl) piperazine, 2,6-diaminocaproic acid, N,N-bis(2-hydroxyethyl)glycine, 2-hydroxypropanoic acid hemicalsium salt, dimethylolpropionic acid, N-methyldiethanolamine, N-ethyldiethanolamine, N-propyldiethanolamine, N-benzyldiethanolamine, N-t-butyldiethanolamine, bis(2-hydroxyethyl) benzylamine, bis(2-hydroxypropyl) aniline, and homologues, combinations, derivatives, or reaction products thereof.

In some embodiments, the second polymer consists essentially of the ionic species. That is, the second polymer may be ionic and function as the ionic species.

In some embodiments, the first polymer and the second polymer are covalently connected in a block copolymer.

The polymer composition according to some embodiments contains, in the polymer matrix or as another component, a segmented copolymer comprising:

one or more soft segments selected from fluoropolymers having an average molecular weight from about 200 g/mol to about 20,000 g/mol, wherein the fluoropolymers are (α,ω)-hydroxyl-terminated and/or (α,ω)-amine-terminated, and either: (i) wherein the soft segments contain the one or more ionic species; or (ii) one or more copolymer chains that are distinct from the soft segments, wherein the copolymer chains contain the one or more ionic species;

one or more isocyanate species, or a reacted form thereof, possessing an isocyanate functionality of 2 or greater; and one or more polyol or polyamine chain extenders or crosslinkers, or a reacted form thereof.

The fluoropolymers may be selected from the group consisting of polyfluoroethers, perfluoropolyethers, polyfluoroacrylates, polyfluorosiloxanes, and combinations thereof.

The segmented copolymer further may include one or more second soft segments selected from polyesters or polyethers, wherein the polyesters or polyethers are (α,ω)-hydroxyl-terminated and/or (α,ω)-amine-terminated. The polyesters or polyethers may be selected from the group consisting of poly(oxymethylene), poly(ethylene glycol), poly(propylene glycol), poly(tetrahydrofuran), poly(glycolic acid), poly(caprolactone), poly(ethylene adipate), poly(hydroxybutyrate), poly(hydroxyalkanoate), and combinations thereof.

Within the segmented copolymer, the ionic species may include one or more species selected from the group consisting of an ionizable salt, an ionizable molecule, a zwitterionic component, a polyelectrolyte, an ionomer, and combinations thereof.

Within the segmented copolymer, the isocyanate species may be selected from the group consisting of 4,4'-methylenebis(cyclohexyl isocyanate), hexamethylene diisocyanate, cycloalkyl-based diisocyanates, tolylene-2,4-diisocyanate, 4,4'-methylenebis(phenyl isocyanate), isophorone diisocyanate, and combinations or derivatives thereof.

The polyol or polyamine chain extenders or crosslinkers may have an average functionality of at least 3. In some embodiments, the polyol or polyamine chain extenders or crosslinkers are selected from the group consisting of 1,3-butanediol, 1,4-butanediol, 1,3-propanediol, 1,2-ethanediol, diethylene glycol, triethylene glycol, tetraethylene glycol, propylene glycol, dipropylene glycol, tripropylene glycol, neopentyl glycol, 1,6-hexane diol, 1,4-cyclohexanedimethanol, ethanol amine, diethanol amine, methyldiethanolamine, phenyldiethanolamine, glycerol, trimethylolpropane, 1,2,6-hexanetriol, triethanolamine, pentaerythritol, ethylenediamine, 1,3-propanediamine, 1,4-buatendiamine, diethyltoluenediamine, dimethylthiotoluenediamine, isophoronediamine, diaminocyclohexane, N,N,N',N'-tetrakis (2-hydroxypropyl) ethylenediamine, and homologues, combinations, derivatives, or reaction products thereof.

Other variations of the invention provide a polymer composition comprising:

(a) a polymer matrix containing one or more ionic species;

(b) one or more chemical redox agents capable of causing metal reduction or oxidation; and (c) one or more metal ions capable of reversibly changing valence from a first oxidation state to a second oxidation state when in the presence of the chemical reducing agents, wherein the metal ions, in the first oxidation state, have a first coordination number with the ionic species, wherein the metal ions, in the second oxidation state, have a second coordination number with the ionic species, and wherein the first coordination number is greater than the second coordination number.

Variations of the invention provide a reversibly crosslinkable polymer composition comprising:

(a) a polymer matrix containing one or more ionic species; and (b) one or more metal ions characterized in that the metal ions (i) change valence from a first oxidation state to a second oxidation state when in the presence of a reducing agent, and (ii) change valence from the second oxidation state back to the first oxidation state when in the presence of an oxidizing agent, wherein the metal ions, in the first oxidation state, have a first coordination number with the ionic species, wherein the metal ions, in the second oxidation state, have a second coordination number with the ionic species, wherein the first coordination number is greater than the second coordination number, and wherein the polymer composition has a higher crosslink density at the first coordination number than at the second coordination number.

The reversible crosslink density can give rise to many reversible differences in properties, including chemical properties (e.g., solvent or acid resistance), physical properties (e.g. density or porosity), mechanical properties (e.g., strength or toughness), electrical properties (e.g., electrical resistivity), and so on.

In some embodiments, the polymer composition is characterized as "thermoplastic/thermoset-switchable" which means that the composition can be transformed between thermoset properties at the metal ion first coordination number, on the one hand, and thermoplastic properties at the metal ion second coordination number, on the other hand. The second coordination number is lower than the first coordination number which causes a lower crosslink density and, therefore, mechanical properties associated with thermoplastic polymers. This can be done for a certain period of time, such as to allow the polymer to self-heal (e.g., repair cracks or other defects)—followed by reversal back to the thermoset properties arising from the higher crosslink density (first coordination number).

In preferred embodiments, the reversible crosslinking of the polymer network does not utilize high temperature (heating) as a trigger. In various embodiments, reversible crosslinking occurs in response to an acid, a base, a redox reagent, and/or light-mediated chemical reaction. In preferred embodiments, the polymer network is contained in a film or coating, not in a sol-gel system.

In a specific embodiment, a segmented copolymer composition is employed. The composition comprises one or more α,ω (alpha, omega)-amine-terminated or α,ω (alpha, omega)-hydroxyl-terminated polyfluoropolymer first soft segments having an average molecular weight of between about 500 grams per mole to about 20,000 grams per mole. The exemplary composition further comprises one or more polyethylene glycol second soft segments having an average molecular weight of between about 500 grams per mole to about 20,000 grams per mole. Additionally, the composition may comprise one or more low-molecular-weight charged monomer species. A total content of the one or more first soft segments and the one or more second soft segments is from about 40% by weight to about 90% by weight, based on a total weight percent of the composition. The composition further comprises one or more hard segments present, for example, in an amount of from about 15% by weight to about 50% by weight, based on the total weight percent of the composition. The composition further comprises one or more low-molecular-weight charged monomers in an amount from about 0.5% to 15% by weight, based on the total weight percent of the composition. The one or more hard segments comprise a combination of one or more isocyanate species and one or more low-molecular-weight polyol or polyamine chain extenders or crosslinkers.

Some variations utilize a segmented copolymer composition comprising:

(a) one or more first soft segments selected from fluoropolymers having an average molecular weight from about 200 g/mol to about 20,000 g/mol, wherein the fluoropolymers are (α,ω)-hydroxyl-terminated and/or (α,ω)-amine-terminated;

(b) optionally, one or more second soft segments including a second polymer;

(c) one or more ionic species contained within the soft segments and/or contained in copolymer chains that are distinct from the soft segments;

(d) one or more isocyanate species, or a reacted form thereof in a hard segment, possessing an isocyanate functionality of 2 or greater; and (e) one or more polyol or polyamine chain extenders or crosslinkers, or a reacted form thereof in the hard segment, wherein the chain extenders or crosslinkers are distinct from the ionic species.

It is noted that (α,ω)-terminated polymers are terminated at each end of the polymer. The α-termination may be the same or different than the w-termination. Also it is noted that in this disclosure, "(α,ω)-termination" includes branching at the ends, so that the number of terminations may be greater than 2 per polymer molecule. The polymers herein may be linear or branched, and there may be various terminations and functional groups within the polymer chain, besides the end (α,ω) terminations.

In some embodiments, the molar ratio of the second soft segments (when present) to the first soft segments is from about 0.1 to about 2.0. In various embodiments, the molar ratio of the second soft segments to the first soft segments is about 0, 0.05, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 1.95.

In this description, "polyurethane" is a polymer comprising a chain of organic units joined by carbamate (urethane) links, where "urethane" refers to N(H)—C(=O)—O—. Polyurethanes are generally produced by reacting an isocyanate containing two or more isocyanate groups per molecule with one or more polyols containing on average two or more hydroxyl groups per molecule, in the presence of a catalyst.

Polyols are polymers in their own right and have on average two or more hydroxyl groups per molecule. For example, α,ω-hydroxyl-terminated perfluoropolyether is a type of polyol.

"Isocyanate" is the functional group with the formula —N=C=O. For the purposes of this disclosure, —C(=O)—N(H)—R is considered a derivative of isocyanate. "Isocyanate functionality" refers to the number of isocyanate reactive sites on a molecule. For example, diisocyanates have two isocyanate reactive sites and therefore an isocyanate functionality of 2. Triisocyanates have three isocyanate reactive sites and therefore an isocyanate functionality of 3.

"Polyfluoroether" refers to a class of polymers that contain an ether group—an oxygen atom connected to two alkyl or aryl groups, where at least one hydrogen atom is replaced by a fluorine atom in an alkyl or aryl group.

"Perfluoropolyether" (PFPE) is a highly fluorinated subset of polyfluoroethers, wherein all hydrogen atoms are replaced by fluorine atoms in the alkyl or aryl groups.

"Polyurea" is a polymer comprising a chain of organic units joined by urea links, where "urea" refers to N(H)—(C=O)—N(H)—. Polyureas are generally produced by reacting an isocyanate containing two or more isocyanate groups per molecule with one or more multifunctional amines (e.g., diamines) containing on average two or more amine groups per molecule, in the presence of a catalyst.

A "chain extender or crosslinker" is a compound (or mixture of compounds) that link long molecules together and thereby complete a polymer reaction. Chain extenders or crosslinkers are also known as curing agents, curatives, or hardeners. In polyurethane/urea systems, a curative is typically comprised of hydroxyl-terminated or amine-terminated compounds which react with isocyanate groups present in the mixture. Diols as curatives form urethane linkages, while diamines as curatives form urea linkages. The choice of chain extender or crosslinker may be determined by end groups present on a given prepolymer. In the case of isocyanate end groups, curing can be accomplished through chain extension using multifunctional amines or alcohols, for example. Chain extenders or crosslinkers can have an average functionality greater than 2, such as 3 or greater, i.e. beyond diols or diamines.

The one or more chain extenders or crosslinkers (or reaction products thereof) may be present in a concentration, in the segmented copolymer composition, from about 0.01 wt % to about 20 wt %, such as about 0.05 wt % to about 10 wt %.

Note that in certain embodiments, a prepolymer is generated or provided with excess alcohol functionality and curing is done with an isocyanate chain extender.

As meant herein, a "low-surface-energy polymer" means a polymer, or a polymer-containing material, with a surface energy of no greater than 50 mJ/m$^2$. The principles of the invention may be applied to low-surface-energy materials with a surface energy of no greater than 50 mJ/m$^2$, in general (i.e., not necessarily limited to polymers).

In some embodiments, the low-surface-energy polymer includes a fluoropolymer, such as (but not limited to) a fluoropolymer selected from the group consisting of polyfluoroethers, perfluoropolyethers, fluoroacrylates, fluorosilicones, and combinations thereof.

In these or other embodiments, the low-surface-energy polymer includes a siloxane. A siloxane contains at least one Si—O—Si linkage. The low-surface-energy polymer may consist of polymerized siloxanes or polysiloxanes (also known as silicones). One example is polydimethylsiloxane.

In some embodiments, the fluoropolymers are selected from the group consisting of perfluoropolyethers, polyfluoroacrylates, polyfluorosiloxanes, and combinations thereof.

In certain embodiments, the chain ends include different PEG chain lengths. That is, the fluoropolymers may include a fluoropolymer segmented copolymer with poly(ethylene glycol) having the formula HO—(CH$_2$—CH$_2$—O)$_p$—CH$_2$—CF$_2$—O—(CF$_2$—CF$_2$—O)$_m$(CF$_2$—O)$_n$—CF$_2$—CH$_2$—(O—CH$_2$—CH$_2$)$_q$—OH wherein p=0 to 50; q=0 to 50 and q is independently selected from p; m=1 to 100; and n=1 to 100. In certain of these embodiments, one of either p or q is selected from 6 to 50 while the other is selected from 0 to 50. In some embodiments, one or both of the X groups is amine-terminated rather than hydroxyl-terminated.

In some embodiments, the polyesters or polyethers are selected from the group consisting of poly(oxymethylene), poly(ethylene glycol), poly(propylene glycol), poly(tetrahydrofuran), poly(glycolic acid), poly(caprolactone), poly(ethylene adipate), poly(hydroxybutyrate), poly(hydroxyalkanoate), and combinations thereof.

In some embodiments, the isocyanate species is selected from the group consisting of 4,4'-methylenebis(cyclohexyl isocyanate), hexamethylene diisocyanate, cycloalkyl-based diisocyanates, tolylene-2,4-diisocyanate, 4,4'-methylenebis(phenyl isocyanate), isophorone diisocyanate, and combinations or derivatives thereof.

The polyol or polyamine chain extender or crosslinker possesses a functionality of 2 or greater, in some embodiments. At least one polyol or polyamine chain extender may be selected from the group consisting of 1,4-butanediol, 1,3-propanediol, 1,2-ethanediol, glycerol, trimethylolpropane, ethylenediamine, isophoronediamine, diaminocyclohexane, and homologues, derivatives, or combinations thereof.

Following a suitable chemical reaction, the segmented copolymer composition contains, in a hard segment, the reacted form of the one or more isocyanate species, combined with the reacted form of the one or more polyol or polyamine chain extenders or crosslinkers. In some embodiments, the hard segment is present in an amount from about 5 wt % to about 60 wt %, based on total weight of the composition.

In some embodiments, the segmented copolymer composition is derived from an uncured precursor containing the fluoropolymers, the ionic species, the isocyanate species, and the polyol or polyamine chain extenders or crosslinkers, wherein the uncured precursor is dissolved in a non-aqueous, organic solvent. This is known as a solventborne system.

Some variations provide a coating or bulk material comprising:

a substantially continuous matrix containing a first component;

a plurality of inclusions containing a second component, wherein the inclusions are dispersed within the matrix;

one or more metal ions characterized in that the metal ions (i) change valence from a first oxidation state to a second oxidation state when in the presence of a reducing agent, and (ii) change valence from the second oxidation state back to the first oxidation state when in the presence of an oxidizing agent, wherein one of the first component or the second component is a low-surface-energy polymer having a surface energy between about 5 mJ/m$^2$ to about 50 mJ/m$^2$, and the other of the first component or the second component is a hygroscopic material containing one or more ionic species, wherein the low-surface-energy polymer and the hygroscopic material are chemically connected ionically or covalently, wherein the metal ions, in the first oxidation state, have a first coordination number with the ionic species, wherein the metal ions, in the second oxidation state, have a second coordination number with the ionic species, and wherein the first coordination number is greater than the second coordination number.

The low-surface-energy polymer and the hygroscopic material may be phase-separated, i.e. they do not form a single continuous phase. There is preferably chemical and/or physical bonding between the low-surface-energy polymer and the hygroscopic material.

Some compositions include both a polyether and an aliphatic diol carrying an acid group as part of the composition, but does not include aliphatic diols containing long carbon chains having >10 carbons. Some embodiments do not incorporate polyols containing three or more reactive hydroxyl groups. Some compositions contain ionizable groups in combination with perfluoropolyethers, but do not incorporate silanes for crosslinking. Some embodiments do not incorporate waterborne polyurethanes with charged groups to create stable colloidal dispersions in water. Some embodiments do not use ionic liquid counterions.

Some embodiments do not employ atom-transfer radical polymerization to produce or crosslink the polymer. Some embodiments employ ascorbic acid as a reducing/oxidizing agent, but not for a controlled radical polymerization such as atom-transfer radical polymerization. Some embodiments do not employ labile disulfide bonds to reversibly crosslink polymer. Some embodiments do not utilize star-shaped polymers.

Any known methods to fabricate these materials or coatings may be employed. Notably, these materials or coatings may utilize synthesis methods that enable simultaneous deposition of components or precursor materials to reduce fabrication cost and time. In particular, these materials or coatings may be formed by a one-step process, in some embodiments. In other embodiments, these materials or coatings may be formed by a multiple-step process. Coatings may be cast or sprayed from organic solution or from aqueous solution.

The polymer, in some embodiments, is formed from a precursor material (or combination of materials) that may be provided, obtained, or fabricated from starting components. The precursor material is capable of hardening or curing in some fashion, to form a polymer. The precursor material may be a liquid; a multiphase liquid; a multiphase slurry, emulsion, or suspension; a gel; or a dissolved solid (in solvent), for example.

In some variations of the invention, a material or coating precursor is applied to a substrate (such as a surface of an automobile or aircraft) and allowed to react, cure, or harden to form a final coating, wherein the material, coating precursor, or final coating contains a reversible crosslinking agent and optionally a redox reagent.

In some embodiments, a precursor material is prepared and then dispensed (deposited) over an area of interest. Any known methods to deposit precursor materials may be employed. A fluid precursor material allows for convenient dispensing using spray coating or casting techniques over a large area, such as the scale of a vehicle or aircraft.

The fluid precursor material may be applied to a surface using any coating technique, such as (but not limited to)

spray coating, dip coating, doctor-blade coating, spin coating, air knife coating, curtain coating, single and multilayer slide coating, gap coating, knife-over-roll coating, metering rod (Meyer bar) coating, reverse roll coating, rotary screen coating, extrusion coating, casting, or printing. Because relatively simple coating processes may be employed, rather than lithography or vacuum-based techniques, the fluid precursor material may be rapidly sprayed or cast in thin layers over large areas (such as multiple square meters).

When a solvent or carrier fluid is present in the fluid precursor material, the solvent or carrier fluid may include one or more compounds selected from the group consisting of water, alcohols (such as methanol, ethanol, isopropanol, or tert-butanol), ketones (such as acetone, methyl ethyl ketone, or methyl isobutyl ketone), hydrocarbons (e.g., toluene), acetates (such as tert-butyl acetate), acids (such as organic acids), bases, and any mixtures thereof. When a solvent or carrier fluid is present, it may be in a concentration of from about 10 wt % to about 99 wt % or higher, for example.

The precursor material may be converted to an intermediate material or the final polymer using any one or more of curing or other chemical reactions, or separations such as removal of solvent or carrier fluid, monomer, water, or vapor. Curing refers to toughening or hardening of a polymeric material by crosslinking of polymer chains, assisted by electromagnetic waves, electron beams, heat, and/or chemical additives. Chemical removal may be accomplished by heating/flashing, vacuum extraction, solvent extraction, centrifugation, etc. Physical transformations may also be involved to transfer precursor material into a mold, for example. Additives may be introduced during the hardening process, if desired, to adjust pH, stability, density, viscosity, color, or other properties, for functional, ornamental, safety, or other reasons.

The overall thickness, or other dimension, of the final polymer material may be from about 1 μm to about 1 cm or more, such as about 10 μm, 20 μm, 25 μm, 30 μm, 40 μm, 50 μm, 75 μm, 100 μm, 500 μm, 1 mm, 1 cm, or 10 cm.

EXAMPLES

Materials.

Poly(ethylene glycol) (PEG) with molecular weight ($M_n$) of 3,400 g/mol, 4,4'-methylenebis(cyclohexyl isocyanate) (HMDI), 1,4-butanediol (BD), dibutyltin dilaurate (DBTDL), 2,2-bis(hydroxymethyl)propionic acid, N-methyldiethanolamine, potassium tetrathionate, titanium dioxide, L-ascorbic acid, and copper (II) acetate are purchased from Sigma Aldrich. Fluorolink materials (Fluorolink D4000, Fluorolink E10H, and Fluorolink 5147X) are purchased from Solvay Specialty Polymers. All chemicals are used as received without further purification.

Example 1: Synthesis of Polymer with Ionic Species

Hydroxyl-terminated poly(ethylene glycol) ($M_n$=3400 g/mol, 2.50 g, 0.74 mmol) is placed in a 3-neck round-bottom flask that contains an inlet for argon and is equipped with an overhead stirrer (Teflon shaft and blade). While stirring, 4,4'-methylenebis(cyclohexyl isocyanate) (3.72 g, 14.20 mmol) is added to the solution and the flask is placed in an oil bath at 100° C. Dibutyltin dilaurate (0.02 wt %) catalyst is then added to the solution using a micropipette and the reaction is allowed to proceed.

After 1 h, 2,2-bis(hydroxymethyl)propionic acid (0.39 g, 2.91 mmol) is added to the stirring solution and allowed to dissolve and react for 1 h. After 1 h, Fluorolink E10-H (2.78 g, 1.40 mmol) is added to the stirring solution and allowed to react for 2 h at 100° C., forming a prepolymer.

The prepolymer is then allowed to cool down to room temperature. The prepolymer is diluted with tetrahydrofuran (9.15 mL) and placed in a plastic mixing container (FlackTek speedmixer compatible). In a separate vial, 1,4-butanediol (0.77 g, 8.54 mmol) is weighed and diluted with tetrahydrofuran (0.5 mL). The two solutions are combined in the mixing container and placed in the FlackTek at 2300 rpm for 15 s. The polymer can be cast from solution or sprayed using an airbrush to create a polyurethane film/coating.

Example 2: Synthesis of Polymer with Ionic Species

Hydroxyl-terminated poly(ethylene glycol) ($M_n$=3400 g/mol, 2.50 g, 0.74 mmol) is placed in a round-bottom flask that contains an inlet for argon and is equipped with an overhead stirrer (Teflon shaft and blade). While stirring, 4,4'-methylene-bis(cyclohexyl isocyanate) (4.49 g, 17.14 mmol) is added to the solution and the flask is placed in an oil bath at 100° C. Dibutyltin dilaurate (0.02 wt %) catalyst is then added to the solution using a micropipette and the reaction is allowed to proceed.

After 1 h, 2,2-bis(hydroxymethyl)propionic acid (0.79 g, 5.89 mmol) is added to the stirring solution and allowed to dissolve and react for 1 h. After 1 h, Fluorolink E10-H (2.78 g, 1.40 mmol) is added to the stirring solution and allowed to react for 2 h at 100° C., forming a prepolymer.

The prepolymer is then allowed to cool down to room temperature. The prepolymer is diluted with tetrahydrofuran (12.75 mL) and placed in a plastic mixing container (FlackTek speedmixer compatible). In a separate vial, 1,4-butanediol (0.77 g, 8.54 mmol) is weighed and diluted with tetrahydrofuran (0.5 mL). The two solutions are combined in the mixing container and placed in the FlackTek at 2300 rpm for 15 s. The polymer can be casted from solution or sprayed using an airbrush to create a polyurethane film/coating.

Example 3: Synthesis of Polymer with Ionic Species

In a typical experiment, hydroxyl-terminated poly(ethylene glycol) (2.50 g, 0.74 mmol) is placed in a 3-neck round-bottom flask that contains an inlet for argon and is equipped with an overhead stirrer (Teflon shaft and blade). While stirring, 4,4'-methylenebis(cyclohexyl isocyanate) (1.85 g, 7.06 mmol) is added to the solution and the flask is placed in an oil bath at 100° C. Dibutyltin dilaurate (0.02 wt %) catalyst is then added to the solution using a micropipette and the reaction is allowed to proceed.

After 1 h, 2,2-bis(hydroxymethyl)propionic acid (0.30 g, 2.24 mmol) is added to the stirring solution and allowed to dissolve and react for 1 h. After 1 h, Fluorolink E10-H (1.46 g, 0.97 mmol) is added to the stirring solution and allowed to react for 2 h at 100° C., forming a prepolymer.

The prepolymer (6.1 g) is then allowed to cool down to room temperature. The prepolymer is diluted with tetrahydrofuran (6.5 mL) and placed in a plastic mixing container (FlackTek speedmixer compatible). In a separate vial, 1,4-butanediol (0.30 g, 3.33 mmol) is weighed and diluted with tetrahydrofuran (0.5 mL). The two solutions are combined in the mixing container and placed in the FlackTek at 2300 rpm for 15 s. The polymer can be casted from solution or sprayed using an airbrush to create a polyurethane film/coating.

Example 4: Synthesis of Polymer with Ionic Species and Internal Redox Reagent In a typical experiment, hydroxyl-terminated poly(ethylene glycol) (8.50 g, 1 mol eq) is placed in a 3-neck round-bottom flask that contains an inlet for argon and is equipped with an overhead stirrer (Teflon shaft and blade). While stirring, 4,4'-methylenebis(cyclohexyl isocyanate) (6.29 g, 9.6 mol eq) is added to the solution and the flask is placed in an oil bath at 100° C. Dibutyltin dilaurate (0.02 wt %) catalyst is then added to the solution using a micropipette and the reaction is allowed to proceed.

After 1 h, 2,2-bis(hydroxymethyl)propionic acid (1.01 g, 3 mol eq) and L-ascorbic acid (0.44 g, 1 mol eq) is added to the stirring solution and allowed to dissolve and react for 2 h. After 2 h, Fluorolink E10-H (4.95 g, 1 mol eq) is added to the stirring solution and allowed to react for 2 h at 100° C., forming a prepolymer.

The prepolymer is then allowed to cool down to room temperature. The prepolymer is diluted with tetrahydrofuran (~21 mL) and placed in a plastic mixing container (FlackTek speedmixer compatible). In a separate vial, 1,4-butanediol (0.811 g, 3.6 mol eq) is weighed and diluted with tetrahydrofuran (0.9 mL). The two solutions are combined in the mixing container and placed in the FlackTek at 2300 rpm for 15 s. The polymer can be casted from solution or sprayed using an airbrush to create a polyurethane film/coating.

Example 5: Reversible Crosslinking Using pH

Charged constituents in polymers are both water-absorbing and bound with counterions, and when incorporated into polymer systems, they have the ability to change the bulk and surface properties in response to materials bound to the network. These highly charged constituents are incorporated into the polymer coating to demonstrate reversible interchain crosslinking. Upon addition into the polymer, the functional groups are protonated and uncharged, allowing the network to be held together by the hydrogen bonding in hard segment domains of concentrated urethane bonds.

In order to test the crosslinking ability of these polymer films with metal ions, films of the Example 1 or 2 polymer are soaked in calcium hydroxide ($Ca(OH)_2$) solutions (calcium ions bind tightly to carboxylic acid groups). To test for reversible crosslinking within the polymer film, the samples are then soaked in hydrochloric acid solutions to protonate the carboxylic acid groups for removal of $Ca^{2+}$ ions.

Material properties are analyzed using dynamic mechanical analysis (DMA) instrument (Q800, TA Instruments). Modulus versus temperature is screened (1 Hz, 3° C./min) along with stress-versus-strain response of the coating films (5%/min). Large specimens are cut into dog bones and tested for tensile strength and elongation using an Instron (Instron 5565, 10 mm/min).

Figure 4:
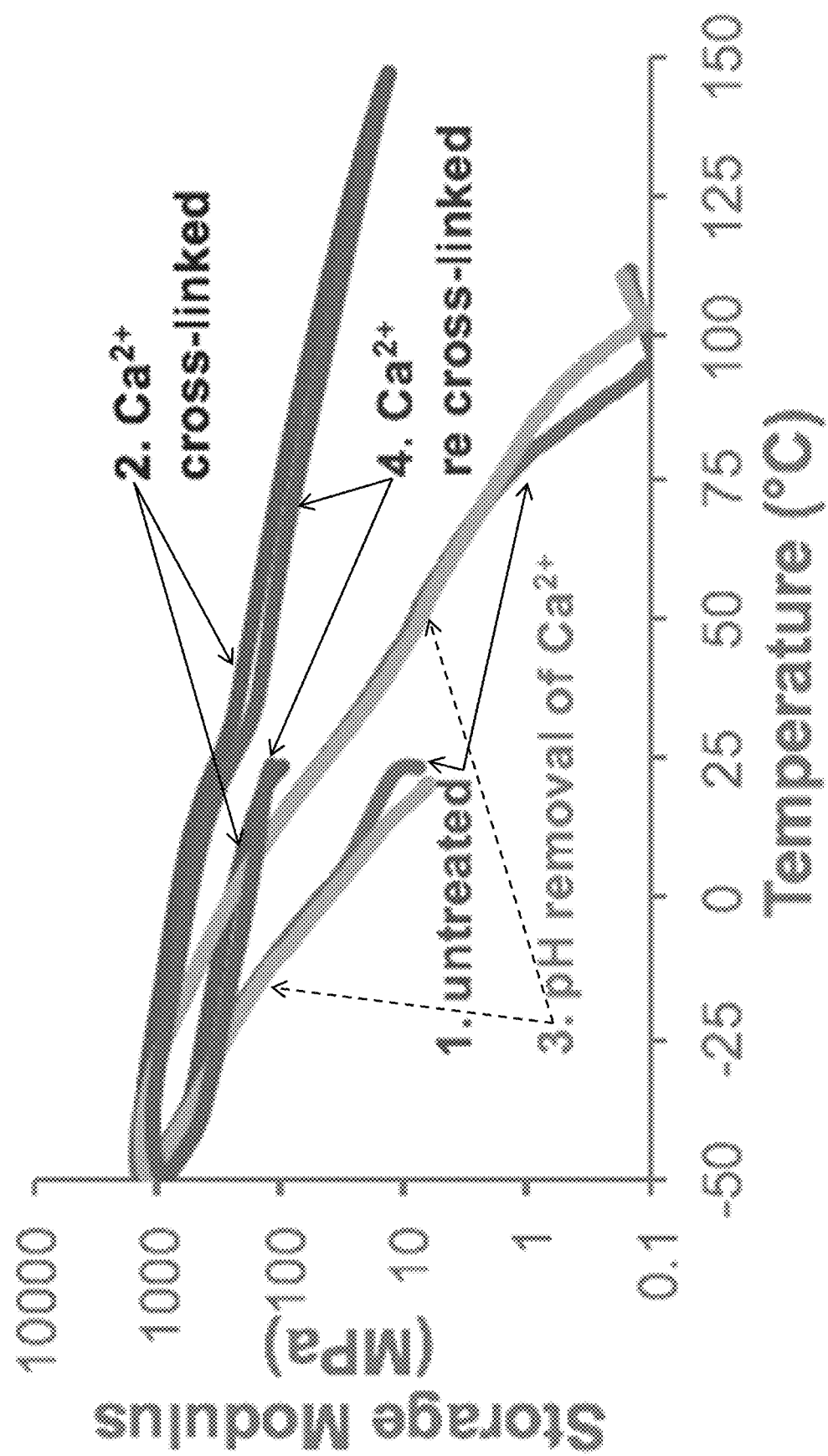
FIG. 4 shows a graph of polymer storage modulus versus temperature, with Ca$^{2+}$ as the reversible crosslinking agent, demonstrating a full cycle of reversibility in Example 5.

DMA screens of modulus versus temperature provide information on rigidity of the samples as well as transition temperatures ($T_g$ and $T_m$). FIG. 4 shows a full cycle of reversible crosslinking demonstrated using $Ca^{2+}$ as a model metal ion, with sequential $Ca^{2+}$ and HCl soaks. At room temperature, the film modulus starts at 13 MPa for the untreated film and reaches 132 MPa for the $Ca^{2+}$-soaked film, giving a 10-fold increase in modulus. Another notable difference from this data is the melting/softening temperature of the untreated and $Ca^{2+}$-soaked films. The hydrogen bonding of urethane groups destabilizes with heat, and the untreated film melts long before reaching 150° C. On the other hand, the $Ca^{2+}$-soaked film maintains a modulus of 14 MPa at 150° C., indicative of ion-mediated crosslinking giving higher thermal stability.

The same film is then soaked in acidic solution (HCl) to protonate the functional groups in order to destabilize crosslinking and remove $Ca^{2+}$, which results in complete reversal to a lower modulus and melting temperature. In order to prove reversibility, the film is re-soaked in $Ca^{2+}$ solution, regaining rigidity and thermal stability, and overlapping with the previous $Ca^{2+}$-soaked modulus versus temperature curve in FIG. 4.

Example 6: Reversible Crosslinking Using Reducible Ions

In this example, polymer films are prepared (Example 1 or 2 polymer) and crosslinked using copper (II) metal ions with proven reducibility with photosensitive dyes. Embedded metal ions are tested for chemical and light reduction within film and properties analyzed by DMA analysis. Following a similar protocol to $Ca^{2+}$ crosslinking (Example 6), the films are soaked in a $Cu^{2+}$ solution.

Figure 5:
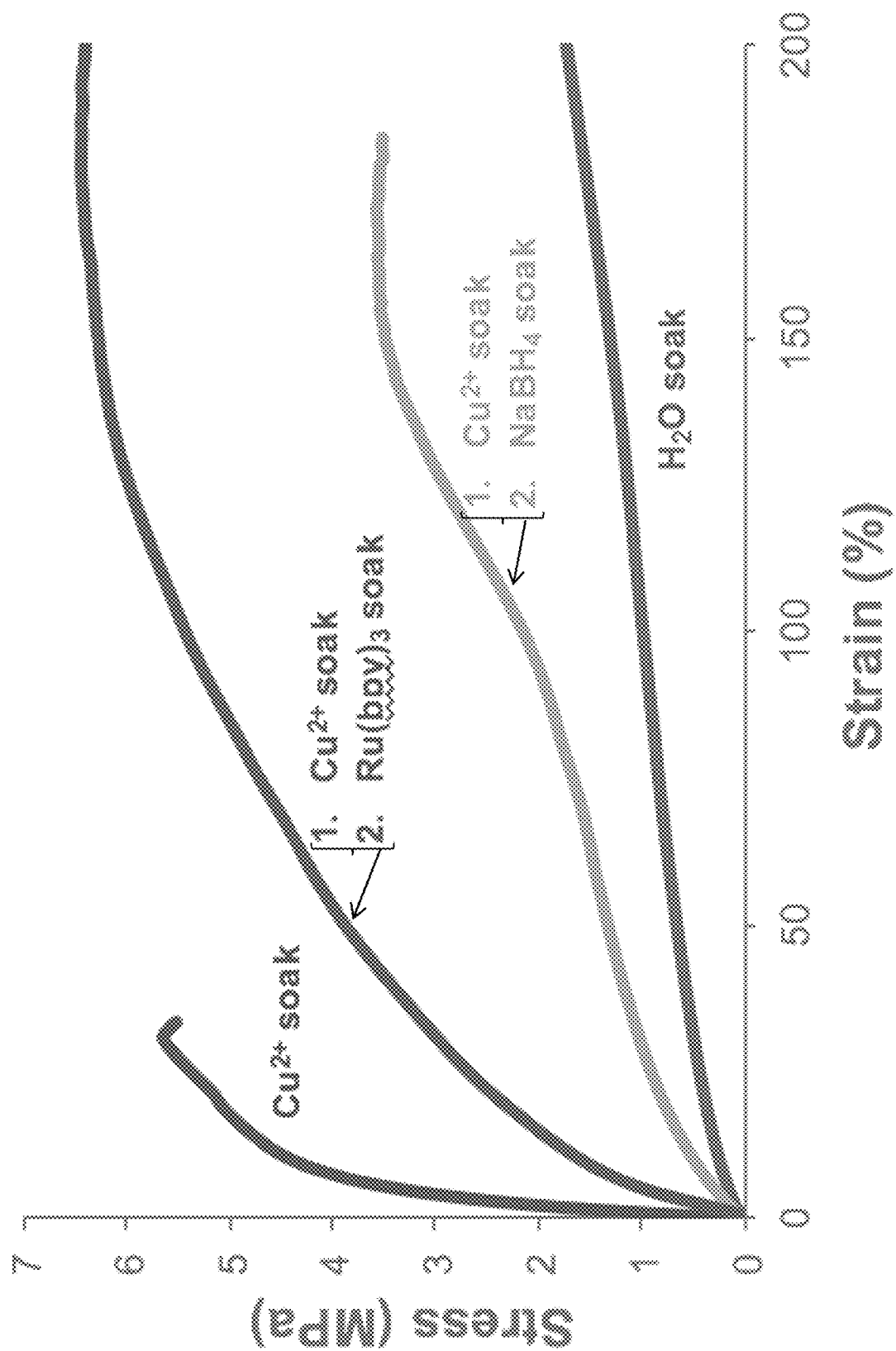
FIG. 5 shows a graph of polymer stress versus strain, with Cu$^{2+}$ as the reversible crosslinking agent, demonstrating a change in mechanical response of the polymer in Example 6.

It is experimentally found that $Cu^{2+}$ induces a higher crosslinking density, reducing the flexibility of the film versus the highly flexible untreated film. After $Cu^{2+}$ exposure, the film requires 10× the amount of stress to strain the film by 30% elongation, compared to the film without exposure to copper (II) ions (FIG. 5).

When the metal ions are chemically reduced, the film's initial properties are almost recovered with only 2× the amount of stress needed for 30% elongation, as compared to the film before $Cu^{2+}$ exposure.

To test light-induced reduction, $Cu^{2+}$ embedded films are soaked in a solution containing photosensitizing dye and electron donors. After irradiating with light, the film is tested and shows almost a 50% reduction in the amount of stress needed to elongate 30%. The tests also show that the ions in the film are reduced with visible light when soaked with photosensitizing dye.

Example 7: Reversible Crosslinking with Redox Reagent

Figure 6:
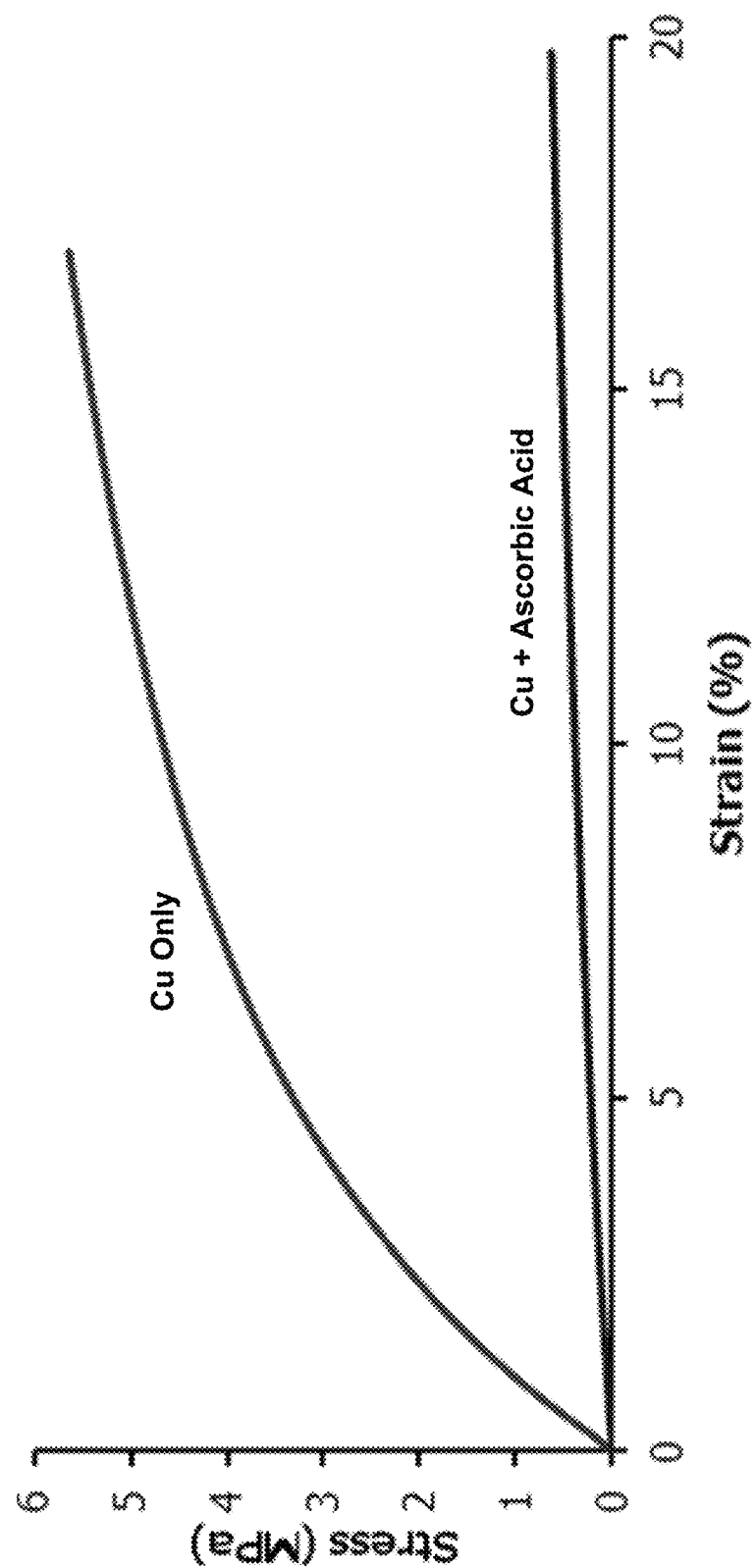
FIG. 6 shows a graph of polymer stress versus strain, with Cu$^{2+}$ as the reversible crosslinking agent and ascorbic acid as a redox reagent in Example 7.

The polymer of Example 3 is used, with ascorbic acid as the redox reagent. A post-cure method is utilized to incorporate copper(II) crosslinking moieties into the polymer film. FIG. 6 shows the polymer film before (top curve) and after (bottom curve) soaking in an ascorbic acid solution. This chart demonstrates the redox reaction of $Cu^{2+}$ embedded in the polymer film, using ascorbic acid as the redox reagent.

The film with copper(II) is much tougher (larger area under the stress vs. strain curve) than the exact same film that has soaked in a solution of ascorbic acid. This is indicative of the divalent copper(II) cations ionically crosslinking with the ionic species (2,2-bis(hydroxymethyl)propionic acid) contained in the polymer. After reduction of the copper species to a non-crosslinking state, the polymer strength diminishes substantially. The reversible crosslinking gives a reversible transition in mechanical properties.

Example 8: Chemical Reduction and Photoreduction of Metal Ions

Polymer films are soaked in solutions of calcium hydroxide, copper (II) acetate, or iron (II) acetate to incorporate the metal cations into the polymer network. The ions are reduced chemically, with a reducing agent such as sodium borohydride or hydrazine, or with UV-light. In the latter system, the metal crosslinked polymer film is subsequently soaked in an aqueous solution of tris(bipyridine)ruthenium (II) chloride ([Ru(bpy)$_3$]$^{2+}$) and dimethylamine. A broadband mercury lamp is used to irradiate the polymer film and induce a photoactivated reduction. Mechanical properties are tested by dynamic mechanical analysis. The reduction of metal ions in solution is followed using ultraviolet-visible spectroscopy (Perkin Elmer Lambda 950). This is accomplished by monitoring the change in absorbance spectrum as valence state of the metal ions changes.

Example 9: Solution-Based Reduction of Copper-Containing Polymer of Example 3

A piece of cured polymer from Example 3 is soaked in a 10 mM aqueous copper acetate solution for about 24 h. The film is then removed from the solution and allowed to dry at room temperature. The mechanical properties are measured and the film is then soaked in either a 10 mM solution of sodium borohydrate or 10 mM ascorbic acid solution (80:20 water:acetonitrile). After about 24 h in solution, the film is removed and patted dry, and the tensile properties are evaluated. The film is then dried at 50° C. for 30 min and again subjected to mechanical testing.

Example 10: Photoreduction of Copper-Containing Polymer of Example 3

In one approach to achieving photoreduction of metallic ions, an organometallic photosensitizer is employed. A piece of cured Example 3 polymer is soaked in a 10 mM aqueous copper (II) acetate solution for about 24 h. The film is then removed from solution and allowed to dry at room temperature, and the mechanical properties are measured. The sample is then soaked in 10 mM tris(bipyridine)ruthenium (II) chloride and dimethylaniline for 2 hours. The sample is dried in air at room temperature, and illuminated with a Hg lamp for 12 minutes. The strip is again subjected to mechanical testing.

Example 11: Photoreduction of Copper-Containing Polymer of Example 3

In another approach to achieving photoreduction of metallic ions, percolating semiconductor nanoparticles are included in the polymer network as a photoinitiator. In particular, a piece of cured Example 3 polymer is sprayed with 1 wt % TiO$_2$. The cured polymer is soaked in a 10 mM aqueous copper (II) acetate solution for about 24 h. The film is then removed from solution and allowed to dry at room temperature, and the mechanical properties are measured.

Variations of the invention provide film, coating, or object containing any of the disclosed polymer compositions. The film, coating, or object may be characterized as reversible, re-mendable, self-healing, mechanically adjustable, and/or thermoplastic/thermoset-switchable, in various embodiments. Additionally an anti-corrosion benefit can be derived from the reversible control of redox species contained within a coating material.

Practical applications for the present invention include, but are not limited to, vehicle windows, cameras, optical lenses, filters, instruments, sensors, eyeglasses, aircraft surfaces, satellites, and weapon systems. For example, automotive applications can utilize these coatings to prevent the formation of ice or debris on back-up camera lenses or back-up sensors. The principles taught herein may also be applied to self-cleaning materials, corrosion-free coatings, etc.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A polymer composition comprising:
    (a) a first polymer containing a plurality of ionic species disposed along a chain backbone of said first polymer, wherein said plurality of ionic species has an ionic charge polarity;
    (b) a redox reagent; and
    (c) a reversible crosslinking agent selected to be capable of controllably and reversibly changing from a first oxidation state to a second oxidation state when in the presence of said redox reagent,
    wherein said reversible crosslinking agent, in said first oxidation state, has a first coordination number with said ionic species,
    wherein said reversible crosslinking agent, in said second oxidation state, has a second coordination number with said ionic species, and
    wherein said first coordination number is different than said second coordination number.

2. The polymer composition of claim 1, wherein said first polymer is selected from the group consisting of polyurethanes, polyacrylates, polyamides, polysiloxanes, polycarbonates, and combinations thereof.

3. The polymer composition of claim 2, wherein said first polymer is a segmented polyurethane.

4. The polymer composition of claim 2, wherein said first polymer is a polyurethane that includes:
    (a) one or more first soft segments including a first polymer selected from polyesters or polyethers having an average molecular weight from about 200 g/mol to about 20,000 g/mol, wherein said polyethers or polyesters are (α,ω)-hydroxyl-terminated and/or (α,ω)-amine-terminated;
    (b) said plurality of ionic species contained within said first soft segments and/or contained in copolymer chains that are distinct from said first soft segments;

(d) one or more isocyanate species, or a reacted form thereof, possessing an isocyanate functionality of 2 or greater;

(e) one or more polyol or polyamine chain extenders or crosslinkers, or a reacted form thereof.

5. The polymer composition of claim 1, wherein said first polymer is a fluoropolymer having an average molecular weight from about 500 g/mol to about 20,000 g/mol, wherein the fluoropolymer is $(\alpha,\omega)$-hydroxyl-terminated and/or $(\alpha,\omega)$-amine-terminated, and wherein the fluoropolymer is present in the triblock structure:

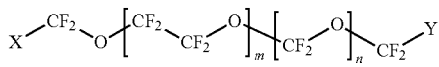

wherein:

X, Y=$CH_2$—(O—$CH_2$—$CH_2$)$_p$-T, and X and Y are independently selected;

p=1 to 50;

T is a hydroxyl or amine terminal group;

m=1 to 100; and n=1 to 100.

6. The polymer composition of claim 1, wherein said composition further comprises one or more second soft segments including a second polymer.

7. The polymer composition of claim 6, wherein said second polymer is selected from the group consisting of polyethers, polyesters, polysiloxanes, polycarbonates, and combinations thereof.

8. The polymer composition of claim 6, wherein said first and second polymer are covalently bonded to each other.

9. The polymer composition of claim 1, wherein said ionic species is selected from carboxylates, sulfonates, phosphates, imidazoliums, or combinations, derivatives, or reaction products thereof.

10. The polymer composition of claim 1, wherein said ionic species is selected from the group consisting of 2,2-bis(hydroxymethyl)butyric acid, N,N-bis(2-hydroxyethyl)-2-aminoethanesulfonic acid, N-methyl-2,2'-iminodiethanol, 3-dimethylamino-1,2-propanediol, 2,2-bis(hydroxymethyl) propionic acid, 1,4-bis(2-hydroxyethyl)piperazine, 2,6-diaminocaproic acid, N,N-bis(2-hydroxyethyl)glycine, 2-hydroxypropanoic acid hemicalsium salt, (2,2-bis-(1-(1-methyl imidazolium)-methylpropane-1,3-diol bromide), 1,2-bis(2'-hydroxyethyl)imidazolium bromide, and (3-hydroxy-2-(hydroxymethyl)-2-methylpropyl)-3-methyl-1H-3$\lambda^4$-imidazol-1-ium bromide, dimethylolpropionic acid, N-methyldiethanolamine, N-ethyldiethanolamine, N-propyldiethanolamine, N-benzyldiethanolamine, N-t-butyldiethanolamine, bis(2-hydroxyethyl) benzylamine, bis(2-hydroxypropyl) aniline, and homologues, combinations, derivatives, or reaction products thereof.

11. The polymer composition of claim 1, wherein said redox reagent is a reducing agent, and wherein said first coordination number is higher than said second coordination number.

12. The polymer composition of claim 1, wherein said redox reagent is an oxidizing agent, and wherein said first coordination number is lower than said second coordination number.

13. The polymer composition of claim 1, wherein said polymer composition includes an organic photosensitizer.

14. The polymer composition of claim 1, wherein said polymer composition includes an inorganic semiconducting photosensitizer.

15. The polymer composition of claim 1, wherein said polymer composition includes a photosensitizer selected from the group consisting of tris(bipyridine)ruthenium(II) chloride, methylene blue, titanium dioxide, and combinations thereof.

16. The polymer composition of claim 1, wherein said redox reagent is selected from the group consisting of ascorbic acid, hydrazine, sodium borohydride, benzenediols, and combinations thereof.

17. The polymer composition of claim 1, wherein said redox reagent is present in said polymer composition at a concentration from about 0.01 wt % to about 10 wt %.

18. The polymer composition of claim 1, wherein one of said first oxidation state and said second oxidation state is +1 or −1.

19. The polymer composition of claim 1, wherein said reversible crosslinking agent includes a metal ion.

20. The polymer composition of claim 19, wherein said metal ion is selected from the group consisting of ions of Cu, Ca, Ni, Hg, Cd, Fe, Co, Ti, Sn, and combinations thereof.

21. The polymer composition of claim 1, wherein said reversible crosslinking agent includes an organic ion.

22. The polymer composition of claim 1, wherein said reversible crosslinking agent includes an inorganic ion.

23. The polymer composition of claim 1, wherein said reversible crosslinking agent has a redox potential less than 1.0 V.

24. The polymer composition of claim 1, wherein said reversible crosslinking agent is present in said polymer composition at a concentration from about 0.1 wt % to about 50 wt %.

25. The polymer composition of claim 1, wherein said polymer composition is disposed in a coating or film.

* * * * *